(12) United States Patent
Kaeriyama

(10) Patent No.: US 11,396,609 B2
(45) Date of Patent: Jul. 26, 2022

(54) INK FOR INK JET RECORDING, METHOD FOR PRODUCING INK FOR INK JET RECORDING, AND IMAGE RECORDING METHOD

(71) Applicant: FUJIFILM CORPORATION, Tokyo (JP)

(72) Inventor: Atsushi Kaeriyama, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/013,872

(22) Filed: Sep. 8, 2020

(65) Prior Publication Data

US 2020/0399490 A1 Dec. 24, 2020

Related U.S. Application Data

(63) Continuation of application No. PCT/JP2019/014162, filed on Mar. 29, 2019.

(30) Foreign Application Priority Data

Mar. 30, 2018 (JP) .............................. JP2018-069684

(51) Int. Cl.
| | | |
|---|---|---|
| C09D 11/322 | (2014.01) | |
| B41J 2/01 | (2006.01) | |
| B41M 5/00 | (2006.01) | |
| C09D 11/033 | (2014.01) | |
| C09D 11/037 | (2014.01) | |
| C09D 11/107 | (2014.01) | |
| C09D 11/38 | (2014.01) | |

(52) U.S. Cl.
CPC ............... *C09D 11/322* (2013.01); *B41J 2/01* (2013.01); *B41M 5/0023* (2013.01); *C09D 11/033* (2013.01); *C09D 11/037* (2013.01); *C09D 11/107* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/101; C09D 11/033; C09D 11/037; C09D 11/107; C09D 11/322; C09D 11/36; C09D 11/38; C09D 11/40; C09D 11/30; C09D 11/32; C09D 11/324; C09D 11/328; C09D 11/102; C09D 11/005; C09D 11/54; C09D 11/52; C09D 11/106; B41M 1/04; B41M 5/0047; B41M 5/0064; B41M 7/0081; A61L 2/087; A61L 2202/18; A61L 2202/23
See application file for complete search history.

(56) References Cited

U.S. PATENT DOCUMENTS

| | | | |
|---|---|---|---|
| 6,261,353 B1 | 7/2001 | Doi et al. | |
| 2002/0177633 A1 | 11/2002 | Komatsu et al. | |
| 2006/0293410 A1 | 12/2006 | Tokita et al. | |
| 2009/0202724 A1* | 8/2009 | Arai ..................... | C09D 11/033 427/256 |
| 2010/0166962 A1* | 7/2010 | Ohzeki .................. | C09D 11/38 427/256 |
| 2010/0216936 A1* | 8/2010 | Inushima .............. | C09B 69/109 524/548 |
| 2011/0069110 A1* | 3/2011 | Matsumoto ....... | C08F 220/1811 347/21 |
| 2011/0069111 A1* | 3/2011 | Matsumoto ............ | C09D 11/38 347/21 |

(Continued)

FOREIGN PATENT DOCUMENTS

| | | | |
|---|---|---|---|
| JP | H11-315237 A | 11/1999 | |
| JP | H11-349873 A | 12/1999 | |

(Continued)

OTHER PUBLICATIONS

Extended European Search Report dated May 12, 2021, issued in corresponding EP Patent Application No. 19778349.1.

(Continued)

*Primary Examiner* — Manish S Shah

(74) *Attorney, Agent, or Firm* — Solaris Intellectual Property Group, PLLC

(57) ABSTRACT

Provided are an ink for ink jet recording, including a pigment, a water-soluble polymer for dispersing the pigment, an alkali metal salt, and a water-soluble organic solvent, in which a ratio of a content of the water-soluble polymer to a total mass of the alkali metal salt is 15 or less, and a content of the water-soluble organic solvent with respect to a total mass of the ink for ink jet recording is 18% by mass or less; a method for producing an ink for ink jet recording; and an image recording method.

11 Claims, No Drawings

(56) References Cited

U.S. PATENT DOCUMENTS

| | | | |
|---|---|---|---|
| 2011/0069112 A1* | 3/2011 | Matsumoto | C08F 220/1811 347/21 |
| 2011/0227992 A1* | 9/2011 | Matsumoto | C09D 11/54 347/21 |
| 2011/0234688 A1* | 9/2011 | Ikoshi | B41J 2/14233 347/21 |
| 2012/0320123 A1 | 12/2012 | Takeda et al. | |
| 2013/0202858 A1 | 8/2013 | Shimohara | |
| 2014/0242352 A1* | 8/2014 | Naruse | C09D 11/326 347/100 |
| 2015/0015639 A1 | 1/2015 | Ito et al. | |

FOREIGN PATENT DOCUMENTS

| | | |
|---|---|---|
| JP | 2003-200582 A | 7/2003 |
| JP | 2005-320382 A | 11/2005 |
| JP | 2007-2122 A | 1/2007 |
| JP | 2010-23339 A | 2/2010 |
| JP | 2010-195933 A | 9/2010 |
| JP | 2011-184628 A | 9/2011 |
| JP | 2013-1854 A | 1/2013 |
| JP | 2013-159689 A | 8/2013 |
| JP | 2015-34277 A | 2/2015 |
| JP | 2015-180710 A | 10/2015 |

OTHER PUBLICATIONS

English language translation of the following: Office action dated Mar. 8, 2022 from the JPO in a Japanese patent application No. 2020-511121 corresponding to the instant patent application.
International Search Report issued in International Application No. PCT/JP2019/014162 dated Jun. 11, 2019.
Written Opinion of the ISA issued in International Application No. PCT/JP2019/014162 dated Jun. 11, 2019.
International Preliminary Report on Patentability issued in International Application No. PCT/JP2019/014162 dated Nov. 26, 2019.
Office action dated Jan. 29, 2021 from the IPO in a Indian patent application No. 202047041430 corresponding to the instant patent application.

* cited by examiner

INK FOR INK JET RECORDING, METHOD FOR PRODUCING INK FOR INK JET RECORDING, AND IMAGE RECORDING METHOD

CROSS-REFERENCE TO RELATED APPLICATIONS

This application is a continuation application of International Application No. PCT/JP2019/014162, filed Mar. 29, 2019, which was published under PCT Article 21(2) in Japanese, and which claims priority from Japanese Patent Application No. 2018-069684, filed Mar. 30, 2018. Each of the above applications is hereby expressly incorporated by reference, in its entirety, into the present specification.

BACKGROUND OF THE INVENTION

1. Field of the Invention

The present disclosure relates to an ink for ink jet recording, a method for producing an ink for ink jet recording, and an image recording method.

2. Description of the Related Art

As an image recording method for forming an image on a recording medium such as paper based on an image data signal, there are recording methods such as an electrophotographic method, a thermal transfer method, and an ink jet method.

In an image recording method (ink jet recording method) using the ink jet method, because an ink is jetted only to an image recording part to record an image directly on a recording medium without necessity of a printing plate, an ink can be used efficiently, making running costs low. Furthermore, the ink jet recording method uses a printing apparatus that is relatively inexpensive, can be downsized, and makes less noise as compared to conventional printing machines. As described above, the ink jet recording method has various advantages over other image recording methods.

Dyes have been used as color materials in aqueous inks for ink jet printers. But an aqueous ink formed of a dye is liable to cause image blurring, and also has a limitation in improving light fastness and water resistance. In order to overcome these drawbacks, aqueous inks formed of pigments as color materials have been used in recent years. In the case of an aqueous ink formed of a pigment, it is required to stably disperse the pigment in an aqueous medium and make a concentration of the pigment uniform from the viewpoint of ink jetting reliability. For this reason, a dispersant is generally used in an aqueous ink or a pigment dispersion serving as a raw material of the aqueous ink to enhance dispersibility and dispersion stability of the pigment.

For example, JP2003-200582A discloses an ink jet printer in which a wiping frequency is higher in a case of using a pigment ink than in a case of using a dye ink, in an ink jet printer using a dye ink having wiping means in combination with a pigment ink.

SUMMARY OF THE INVENTION

Because the ink disclosed in JP2003-200582A has a small content of alkali metal salts with respect to a total mass of a water-soluble polymer, the ink is considered to have inferior pigment dispersibility and thus is not considered to have favorable jettability. Furthermore, the ink is considered to have inferior scratch resistance of an image to be obtained due to a large content of an organic solvent.

A problem to be solved by one embodiment of the present disclosure is to provide an ink for ink jet recording which has excellent ink jettability and image scratch resistance.

A problem to be solved by another embodiment of the present disclosure is to provide a method for producing an ink for ink jet recording which has excellent jettability and image scratch resistance, and an image recording method.

Specific means for solving the above-mentioned problems includes the following aspects.

<1> An ink for ink jet recording, comprising a pigment; a water-soluble polymer for dispersing the pigment; an alkali metal salt; and a water-soluble organic solvent, in which a ratio of a content of the water-soluble polymer to a total mass of the alkali metal salt is 15 or less, and a content of the water-soluble organic solvent with respect to a total mass of the ink for ink jet recording is 18% by mass or less.

<2> The ink for ink jet recording according to <1>, in which a content of the water-soluble organic solvent with respect to the total mass of the ink for ink jet recording is 10% by mass or more.

<3> The ink for ink jet recording according to <1> or <2>, in which a content of the pigment with respect to the total mass of the ink for ink jet recording is 2.0% by mass to 7.5% by mass, and a content of the alkali metal salt with respect to the total mass of the ink for ink jet recording is 0.15% by mass to 1.0% by mass.

<4> The ink for ink jet recording according to any one of <1> to <3>, in which a ratio of a content of the pigment to the total mass of the alkali metal salt is 2 to 30.

<5> The ink for ink jet recording according to any one of <1> to <4>, in which the pigment contains at least one selected from the group consisting of carbon black, a perylene-based pigment, and a perinone-based pigment.

<6> The ink for ink jet recording according to any one of <1> to <5>, in which the pigment contains Pigment Orange 43.

<7> The ink for ink jet recording according to any one of <1> to <6>, further comprising polymer resin particles.

<8> The ink for ink jet recording according to <7>, in which a content of the polymer resin particles with respect to the total mass of the ink for ink jet recording is 3.0% by mass to 15.0% by mass.

<9> The ink for ink jet recording according to any one of <1> to <8>, in which the water-soluble polymer contains a constitutional unit represented by Formula 1.

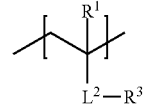

Formula 1

In Formula 1, $R^1$ represents a hydrogen atom or a methyl group, $L^2$ represents —C(=O)O—, —OC(=O)—, or —C(=O)NR^2—, $R^2$ represents a hydrogen atom or an alkyl group having 1 to 6 carbon atoms, and $R^3$ represents an alkyl group having 12 or more carbon atoms.

<10> A method for producing an ink for ink jet recording, the method comprising a step of mixing a pigment, a water-soluble polymer for dispersing the pigment, an alkali metal salt, and a water-soluble organic solvent.

<11> An image recording method comprising a step of jetting the ink for ink jet recording according to any one of <1> to <9> onto a recording medium by an ink jet technique to record an image.

According to an embodiment of the present disclosure, it is possible to provide an ink for ink jet recording which has excellent ink jettability and image scratch resistance.

According to another embodiment of the present disclosure, it is possible to provide a method for producing an ink for ink jet recording which has excellent ink jettability and image scratch resistance, and an image recording method.

DESCRIPTION OF THE PREFERRED EMBODIMENTS

In the present disclosure, a numerical value range represented by using "to" means a range including numerical values described before and after "to" as a lower limit value and an upper limit value.

In the indication of groups (atomic group) in the present specification, the indication not including substitution or unsubstitution includes groups not having a substituent and groups having a substituent. For example, an "alkyl group" refers not only to an alkyl group not having a substituent (unsubstituted alkyl group) but also to an alkyl group having a substituent (substituted alkyl group).

In the present specification, "(meth)acrylate" represents both or any one of acrylate and methacrylate, "(meth)acrylic" represents both or any one of acrylic and methacrylic, and "(meth)acryloyl" represents both or any one of acryloyl and methacryloyl.

In the present disclosure, in a case where there are a plurality of substances corresponding to each of components in a composition, an amount of each of the components in the composition means a total amount of the plurality of substances present in the composition, unless explicitly described otherwise.

In the present specification, the term "step" is not limited to an independent step, and even steps that cannot be clearly distinguished from other steps are also included in this term as long as the intended action of the steps is achieved.

In addition, in the present disclosure, "% by mass" and "% by weight" have the same meaning, and "part by mass" and "part by weight" have the same meaning.

Furthermore, in the present disclosure, a combination of two or more preferable embodiments is a more preferable embodiment.

In the present disclosure, the term "water-soluble" means that solubility in water at 20° C. is 5% by mass or more.

<<Ink for Ink Jet Recording>>

An ink for ink jet recording of the present disclosure (sometimes referred to as an "ink" in the present specification) contains a pigment; a water-soluble polymer for dispersing the pigment; an alkali metal salt; and a water-soluble organic solvent, in which a ratio of a content of the water-soluble polymer to a total mass of the alkali metal salt is 15 or less, and content of the water-soluble organic solvent with respect to a total mass of the ink is 18% by mass or less.

In a case where the pigment is dispersed in the water-soluble polymer, this brings about a state in which the pigment is covered by the water-soluble polymer. Furthermore, by containing the alkali metal salt, the amount of ions increases, and a monovalent cation layer of the alkali metal salt can be formed around the water-soluble polymer covering the pigment. In a case where the distance between the pigments is short, the pigments repel each other due to the Coulomb force of the cation layer, and dispersibility such as sedimentation inhibiting properties and aggregation inhibiting properties can be maintained in a favorable state, and it is thought that this improves ink jettability. Furthermore, in the ink of the present disclosure, the dispersibility of the pigment can be further improved by specifying the ratio of the content of the water-soluble polymer to the total mass of the alkali metal salt to be 15 or less, and thereby ink jettability is remarkably improved. Accordingly, even in a case where the content of the water-soluble organic solvent is suppressed to be relatively small, it is possible to maintain favorable ink jettability.

In general, in a case where the content of the water-soluble organic solvent is high, the drying properties of the ink is poor, and the scratch resistance of the obtained image is easily impaired, but because a content of the water-soluble organic solvent can be suppressed to be relatively low in the ink of the present disclosure, it is possible to realize excellent image scratch resistance in addition to excellent ink jettability. As a result, it is possible to achieve both excellent ink jettability and excellent image scratch resistance.

Hereinafter, each component contained in the ink of the present disclosure will be described in detail.

<Alkali Metal Salt>

The ink of the present disclosure includes an alkali metal salt.

In a case where the pigment is dispersed in the water-soluble polymer, this brings about a state in which the pigment is covered by the water-soluble polymer. In a case where a pigment dispersed by a water-soluble polymer is included, by containing the alkali metal salt, the amount of ions increases, and a monovalent cation layer of the alkali metal salt can be formed around the water-soluble polymer covering the pigment. In a case where the distance between the pigments is short, the pigments repel each other due to the Coulomb force of the cation layer, and dispersibility such as sedimentation inhibiting properties and aggregation inhibiting properties can be maintained in a favorable state.

Examples of alkali metal salts that can be used in the present disclosure include potassium nitrate, sodium chloride, potassium chloride, sodium nitrite, and the like. Among them, potassium nitrate, sodium chloride, and potassium chloride are preferable, and potassium nitrate and sodium chloride are more preferable, from the viewpoints of sedimentation inhibiting properties and aggregation inhibiting properties.

The content of the alkali metal salt is preferably 0.15% by mass to 1.5% by mass, more preferably 0.15% by mass to 1.2% by mass, even more preferably 0.15% by mass to 1.0% by mass, and particularly preferably 0.2% by mass to 1.0% by mass with respect to the total mass of the ink, from the viewpoints of the sedimentation inhibiting properties and the aggregation inhibiting properties of the pigment.

<Water-Soluble Polymer>

The ink of the present disclosure contains a water-soluble polymer as a dispersant, and the ratio of the content of the water-soluble polymer to the total mass of the alkali metal salt is 15 or less. As a result, the sedimentation inhibiting properties and aggregation inhibiting properties of the pigment are excellent, and the ink can be kept with favorable jettability.

From the same viewpoint as above, the ratio of the content of the water-soluble polymer to the total mass of the alkali metal salt is preferably 12 or less, more preferably 10 or less, and even more preferably 5 or less.

The ratio of the content of the water-soluble polymer to the total mass of the alkali metal salt is preferably 0.5 or more. Accordingly, it is possible to further improve the sedimentation inhibiting properties and the aggregation inhibiting properties of the pigment.

Examples of the water-soluble polymer include a water-soluble polymer having a carboxyl group introduced therein, such as homopolymers of acrylic acid, methacrylic acid, or styrene acrylic acid, and copolymers of at least one of acrylic acid, methacrylic acid, or styrene acrylic acid and a monomer having another hydrophilic group.

<Water-Soluble Polymer Having Constitutional Unit Represented by Formula 1>

The ink of the present disclosure preferably contains a water-soluble polymer having a constitutional unit represented by Formula 1 (hereinafter, also referred to as a "constitutional unit a-1").

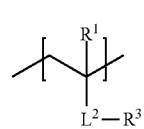

Formula 1

In Formula 1, $R^1$ represents a hydrogen atom or a methyl group; $L^2$ represents —C(=O)O—, —OC(=O)—, or —C(=O)NR$^2$—, $R^2$ represents a hydrogen atom or an alkyl group having 1 to 6 carbon atoms; and $R^3$ represents an alkyl group having 6 or more carbon atoms.

[Constitutional Unit a-1]

The constitutional unit a-1 is a constitutional unit represented by Formula 1.

In Formula 1, $R^1$ is preferably a methyl group.

In Formula 1, $L^2$ represents —C(=O)O—, —OC(=O)—, or —C(=O)NR$^2$—, is preferably —C(=O)O— or —C(=O)NR$^2$, and is more preferably —C(=O)O—.

$R^2$ is preferably a hydrogen atom.

The above description of —C(=O)O— means that the carbon atom in —C(=O)O— is directly bonded to the carbon atom to which $R^1$ in Formula 1 is bonded. The above description of —OC(=O)— means that the carbon atom in —OC(=O)— is directly bonded to the carbon atom to which $R^1$ in Formula 1 is bonded.

Furthermore, the above description "—C(=O)NR$^2$—" means that the carbon atom in —C(=O)NR$^2$— is directly bonded to the carbon atom to which $R^1$ in Formula 1 is bonded.

In Formula 1, $R^3$ is preferably an alkyl group having 6 to 30 carbon atoms, more preferably an alkyl group having 8 to 22 carbon atoms, even more preferably an alkyl group having 12 to 22 carbon atoms, and particularly preferably an alkyl group having 12 to 18 carbon atoms, from the viewpoints of sedimentation inhibiting properties and aggregation inhibiting properties and of reducing an average particle size. The alkyl group may be linear or branched, and may have a ring structure.

The constitutional unit a-1 is preferably a constitutional unit derived from an alkyl(meth)acrylate compound or an alkyl(meth)acrylamide compound.

The content of the constitutional unit a-1 is preferably 10% by mass to 40% by mass, more preferably 10% by mass to 30% by mass, and particularly preferably 20% by mass to 30% by mass with respect to the total mass of the water-soluble polymer from the viewpoint of sedimentation inhibiting properties and aggregation inhibiting properties and of reducing an average particle size.

The water-soluble polymer used in the present disclosure may contain only one kind of the constitutional unit a-1, or may contain two or more kinds of the constitutional unit a-1. In a case where the water-soluble polymer used in the present disclosure contains two or more kinds of the constitutional units a-1, the above content refers to the total content of two or more kinds of the constitutional units a-1.

[Constitutional Unit a-2]

The water-soluble polymer preferably further has a constitutional unit having an aromatic ring (hereinafter, also referred to as a "constitutional unit a-2"), and more preferably further has a constitutional unit represented by Formula 2, from the viewpoint of sedimentation inhibiting properties and aggregation inhibiting properties and of reducing an average particle size.

The aromatic ring is preferably an aromatic hydrocarbon ring, more preferably a benzene ring.

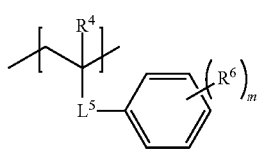

Formula 2

In Formula 2, $R^4$ represents a hydrogen atom or a methyl group; $L^5$ represents a single bond, or a divalent linking group formed by combining two or more groups selected from the group consisting of an alkylene group having 1 to 12 carbon atoms, an alkenylene group having 2 to 12 carbon atoms, —C(=O)—, —O—, —S—, and —NR'—; $R^6$ represents an alkyl group having 1 to 6 carbon atoms, an alkoxy group having 1 to 15 carbon atoms, an amino group, a halogen atom, an aryloxy group having 6 to 20 carbon atoms, or a silyl group; $R^7$ represents a hydrogen atom or an alkyl group having 1 to 6 carbon atoms; and m represents an integer of 0 to 5.

In Formula 2, $R^4$ is preferably a methyl group.

In Formula 2, $L^5$ is preferably a single bond or a group represented by Formula 2-1 or Formula 2-2, and is more preferably a single bond or a group represented by Formula 2-1.

An alkylene group for $L^5$ is preferably an alkylene group having 2 to 10 carbon atoms, more preferably an alkylene group having 2 to 5 carbon atoms, and even more preferably an alkylene group having 2 to 3 carbon atoms. The above-mentioned alkylene group may be linear or branched.

As an alkenylene group for $L^5$, an alkenylene group having 2 to 10 carbon atoms is preferable, an alkenylene group having 2 to 6 carbon atoms is more preferable, and an alkenylene group having 2 to 4 carbon atoms is even more preferable. The above-mentioned alkenylene group may be linear or branched.

$R^7$ is preferably a hydrogen atom.

In Formula 2, it is preferable that $R^6$'s each independently represent an alkyl group having 1 to 6 carbon atoms, an alkoxy group having 1 to 6 carbon atoms, a halogen atom, or an aryloxy group having 6 to 20 carbon atoms, and it is more preferable that $R^6$'s each independently represent an alkyl group having 1 to 6 carbon atoms, a halogen atom, or an aryloxy group having 6 to 20 carbon atoms.

An alkyl group for $R^6$ and an alkyl group contained in an alkoxy group may be linear or branched.

An aryloxy group for $R^6$ is preferably a naphthyloxy group or a phenyloxy group, and more preferably a phenyloxy group.

In Formula 2, m is preferably 0 or 1, and more preferably 0.

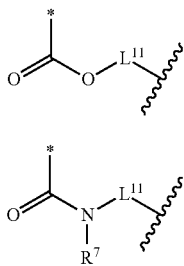

Formula 2-1

Formula 2-2

In Formula 2-1 and Formula 2-2, $L^{11}$ represents an alkylene group having 1 to 12 carbon atoms, an alkenylene group having 2 to 12 carbon atoms, —O—, —S—, or a group represented by a combination thereof, is more preferably an alkylene group having 1 to 12 carbon atoms, —O—, or a group represented by a combination thereof, is even more preferably an alkylene group having 1 to 8 carbon atoms, —O—, or a group represented by a combination thereof, and is still more preferably a group represented by an alkylene group having 1 to 4 carbon atoms, —O—, or a combination thereof.

Preferable embodiments of include a divalent linking group represented by Formula 2-3, Formula 2-4, or Formula 2-5.

In Formula 2-2, $R^7$ has the same meaning as $R^7$ in Formula 2, and the preferable embodiments are also the same.

In Formula 2-1 and Formula 2-2, * represents a bond site with the carbon atom to which $R^4$ in Formula 2 is bonded, and a wavy line part represents a bond site with the benzene ring in Formula 2.

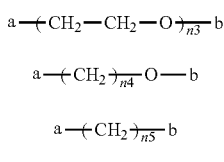

Formula 2-3

Formula 2-4

Formula 2-5

In Formula 2-3 to Formula 2-5, a represents a binding site with —O— in Formula 2-1 or N in Formula 2-2, b represents a bond site to the benzene ring in Formula 2, similarly to the wavy line part in Formula 2-1 and Formula 2-2, n3 represents an integer of 1 to 10, n4 represents an integer of 1 to 5, and n5 represents an integer of 1 to 5.

In Formula 2-3, n3 is preferably an integer of 1 to 5.
In Formula 2-4, n4 is preferably an integer of 1 to 3, and more preferably 2.
In Formula 2-5, n5 is preferably an integer of 1 to 3, more preferably 1 or 2, and even more preferably 1.

The constitutional unit a-2 is preferably a constitutional unit derived from styrene, benzyl (meth)acrylate, phenoxyethyl (meth)acrylate, 2-hydroxy-3-phenoxypropyl (meth)acrylate, or phenoxydiethylene glycol (meth)acrylate, is more preferably a constitutional unit derived from benzyl (meth)acrylate or phenoxyethyl (meth)acrylate, and is even more preferably a constitutional unit derived from benzyl (meth)acrylate.

The content of the constitutional unit a-2 is more preferably 10% by mass to 70% by mass, even more preferably 20% by mass to 60% by mass, still more preferably 25% by mass to 50% by mass, and particularly preferably 30% by mass to 45% by mass with respect to the total mass of the water-soluble polymer, from the viewpoints of sedimentation inhibiting properties and aggregation inhibiting properties and of reducing an average particle size.

The water-soluble polymer used in the present disclosure may contain only one kind of the constitutional unit a-2, or may contain two or more kinds of the constitutional unit a-2. In a case where the polymer dispersant used in the present disclosure contains two or more kinds of the constitutional units a-2, the above content refers to the total content of two or more kinds of the constitutional units a-2.

[Constitutional Unit a-3]

The water-soluble polymer preferably further has a constitutional unit having an acidic group (hereinafter, also referred to as a "constitutional unit a-3"), from the viewpoint of sedimentation inhibiting properties and aggregation inhibiting properties and of reducing an average particle size.

The acidic group in the present disclosure is a substituent having a dissociative proton, and means an acidic group such as a carboxy group, a phosphonyl group, a phosphoryl group, a sulfo group, or a boric acid group. Among them, the acidic group is preferably a carboxy group, a sulfo group, or a phosphonyl group, more preferably a carboxy group.

The acidic group may be in a dissociated form by releasing a proton, or may form a salt.

Furthermore, in the ink, the constitutional unit a-3 may form a salt with the above amine compound.

The constitutional unit a-3 is preferably a constitutional unit derived from (meth)acrylic acid, crotonic acid, itaconic acid, maleic acid, fumaric acid, bis(methacryloxyethyl) phosphate, or 2-acrylamido-2-methylpropanesulfonic acid, and is more preferably a constitutional unit derived from methacrylic acid or acrylic acid.

The content of the constitutional unit a-3 is preferably 3% by mass to 40% by mass, and is more preferably from 5% by mass to 30% by mass with respect to the total mass of the water-soluble polymer, from the viewpoints of sedimentation inhibiting properties and aggregation inhibiting properties and of reducing an average particle size.

The content of the constitutional unit a-3 is preferably an amount such that an acid value of the water-soluble polymer to be described later is 0.5 mmol/g to 3.5 mmol/g (preferably 1.0 mmol/g to 3.0 mmol/g, more preferably 1.0 mmol/g to 2.5 mmol/g).

The water-soluble polymer used in the present disclosure may contain only one kind of the constitutional unit a-3, or may contain two or more kinds of the constitutional unit a-3. In a case where the water-soluble polymer used in the present disclosure contains two or more kinds of the constitutional units a-3, the above content refers to the total content of two or more kinds of the constitutional units a-3.

[Constitutional Unit a-4]

The water-soluble polymer may contain a constitutional unit a-4 which is a constitutional unit other than the above constitutional unit a-1, constitutional unit a-2, and constitutional unit a-3.

The constitutional unit a-4 is not particularly limited, but a constitutional unit derived from a monofunctional (meth)acrylate compound or a constitutional unit derived from a monofunctional (meth)acrylamide compound is preferable, and a monofunctional (meth)acrylate compound is more preferable.

As the constitutional unit a-4, a constitutional unit having at least one structure selected from the group consisting of a hydroxy group, an amino group, and a polyalkyleneoxy structure is more preferable from the viewpoints of sedimentation inhibiting properties and aggregation inhibiting properties and of reducing an average particle size. A constitutional unit having a hydroxy group is more preferable.

Examples of the monofunctional (meth)acrylate compound include alkyl (meth)acrylates such as 2-ethylhexyl (meth)acrylate, hydroxyethyl (meth)acrylate, methyl (meth)acrylate, ethyl (meth)acrylate, isopropyl (meth)acrylate, n-propyl (meth)acrylate, and n-butyl (meth)acrylate; 2-methoxyethyl acrylate, 2-(2-methoxyethoxy)ethyl acrylate, 2-(2-methoxyethoxy)ethyl methacrylate, ethoxytriethylene glycol methacrylate, methoxy polyethylene glycol (molecular weight 200 to 1,000) monomethacrylate, polyethylene glycol (molecular weight 200 to 1,000) monomethacrylate, and the like.

Examples of the monofunctional (meth)acrylamide compound include dimethyl acrylamide, hydroxyethyl (meth)acrylamide, hydroxypropyl (meth)acrylamide, dimethylaminoethyl(meth)acrylamide, dimethylaminopropyl(meth)acrylamide, isopropyl (meth)acrylamide, diacetone acrylamide, and the like.

Among them, hydroxyethyl (meth)acrylate, 2-methoxyethyl acrylate, 2-(2-methoxyethoxy)ethyl acrylate, methoxy polyethylene glycol (molecular weight 200 to 1,000) monomethacrylate, polyethylene glycol (molecular weight 200-1,000) monomethacrylate, or methyl (meth)acrylate is preferable, and methyl (meth)acrylate is more preferable.

The content of the constitutional unit a-4 is preferably 3% by mass to 40% by mass, and is more preferably from 5% by mass to 30% by mass with respect to the total mass of the water-soluble polymer, from the viewpoints of sedimentation inhibiting properties and aggregation inhibiting properties and of reducing an average particle size.

The water-soluble polymer used in the present disclosure may contain only one kind of the constitutional unit a-4, or may contain two or more kinds of the constitutional unit a-4. In a case where the water-soluble polymer used in the present disclosure contains two or more kinds of the constitutional units a-4, the above content refers to the total content of two or more kinds of the constitutional units a-4.

Furthermore, from the viewpoints of sedimentation inhibiting properties and aggregation inhibiting properties and of reducing an average particle size, the water-soluble polymer is preferably a resin having a constitutional unit represented by Formula 1 and a constitutional unit having an aromatic ring; is more preferably a resin having a constitutional unit represented by Formula 1, a constitutional unit having an aromatic ring, and a constitutional unit having an acidic group; even more preferably a resin having a constitutional unit represented by Formula 1, a constitutional unit having an aromatic ring, a constitutional unit having an acidic group, and a constitutional unit having at least one structure selected from the group consisting of a hydroxy group, an amino group and a polyalkyleneoxy structure; and is particularly preferably a resin having a constitutional unit represented by Formula 1, a constitutional unit having an aromatic ring, a constitutional unit having an acidic group, and a constitutional unit having a hydroxy group.

Furthermore, the water-soluble polymer is preferably an addition polymerization type resin, and more preferably an acrylic resin, from the viewpoints of sedimentation inhibiting properties and aggregation inhibiting properties and of reducing an average particle size.

An acrylic resin according to the present disclosure is a resin having 50% by mass or more of constitutional units derived from at least one compound selected from the group consisting of (meth)acrylic compounds and (meth)acrylamide compounds, in which a content of a constitutional unit is preferably 60% by mass or more, more preferably 80% by mass or more, and even more preferably 90% by mass or more.

The water-soluble polymer may be a homopolymer or a copolymer, but is preferably a copolymer.

[Content of Water-Soluble Polymer]

The content of the water-soluble polymer is preferably 0.3% by mass to 3.0% by mass with respect to the total mass of the ink, from the viewpoints of sedimentation inhibiting properties, aggregation inhibiting properties, and jettability.

The content of the water-soluble polymer with respect to the total mass of the ink is more preferably 0.3% by mass to 2.0% by mass, and even more preferably 0.5% by mass to 1.3% by mass.

[Acid Value of Water-Soluble Polymer]

The acid value of the water-soluble polymer is preferably 0.5 mmol/g to 3.5 mmol/g, more preferably 1.0 mmol/g to 3.0 mmol/g, and even more preferably 1.5 mmol/g to 2.5 mmol/g, from the viewpoints of sedimentation inhibiting properties and aggregation inhibiting properties and of reducing an average particle size.

The acid value of the water-soluble polymer is measured according to JIS K 0070 (1992) and calculated by converting it as 1 mmol/g=56.1 mgKOH/g.

[Weight-Average Molecular Weight of Water-Soluble Polymer]

The weight-average molecular weight of the water-soluble polymer is preferably 5,000 to 50,000, more preferably 8,000 to 40,000, and even more preferably 10,000 to 30,000, from the viewpoints of sedimentation inhibiting properties and aggregation inhibiting properties and of reducing an average particle size.

In the present specification, the weight-average molecular weight of the water-soluble polymer is measured by gel permeation chromatography (GPC). In GPC, HLC-8220GPC (manufactured by Tosoh Corporation) was used, three columns of TSKgeL Super HZM-H, TSKgeL Super HZ4000, and TSKgeL Super HZ2000 (manufactured by Tosoh Corporation, 4.6 mm ID×15 cm) which are connected in series are used, and NMP (N-methylpyrrolidone) is used as an eluent. In addition, a refractive index (RI) detector (differential refractive index detector) is used to perform GPC under conditions of sample concentration of 0.35% by mass, flow rate of 0.35 ml/min, sample injection amount of 10 μl, and measurement temperature of 40° C. In addition, a calibration curve is produced from "standard sample TSK standard, polystyrene" manufactured by Tosoh Corporation: eight samples of "F-40," "F-20," "F-4," "F-1," "A-5000," "A-2500," "A-1000," and "n-propylbenzene."

[I/O Value]

The I/O value (inorganic/organic value) of the water-soluble polymer is preferably 0.50 to 0.80, and is more preferably 0.50 to 0.75, from the viewpoints of sedimentation inhibiting properties and aggregation inhibiting properties.

The I/O value is a value obtained by organically treating the polarities of various organic compounds, which are also called inorganic value/organic value, and is one of the functional group contribution methods for setting parameters for each functional group.

The above-mentioned I/O value is described in detail in the organic conceptual diagram (Yoshio Koda, Sankyo Publishing (1984)) and the like. The concept of I/O value is that the property of a compound is divided into an organic group showing a covalent bond property and an inorganic group showing an ionic bond property, and all organic compounds are shown at orthogonal coordinates named as organic axes or inorganic axes by locating them ay the above points one by one.

The above-mentioned inorganic value is a numerical value based on the hydroxyl group, which indicates the magnitude of the influence of various substituents and bonds of the organic compound on the boiling point. Specifically, in a case where the distance between the boiling point curve of linear alcohol and the boiling point curve of linear paraffin is taken in the vicinity of 5 carbon atoms, it will be about 100° C., and the influence of one hydroxyl group is set to 100 numerically, and the numerical value of the influence of various substituents or various bonds on the boiling point based on this numerical value is the inorganic value of the substituent possessed by the organic compound. For example, the —COOH group has an inorganic value of 150, and the double bond has an inorganic value of 2. Accordingly, the inorganic value of a certain kind of organic compound means the sum of the inorganic values of various substituents, bonds, and the like, which are possessed by the compound.

Furthermore, the above-mentioned organic value is determined based on the influence on the boiling point of the carbon atom representing the methylene group, with the methylene group in the molecule as a unit. That is, because the average value of the boiling point increase due to the addition of one carbon at around 5 to 10 carbon atoms in the linear saturated hydrocarbon compound is 20° C., based on this, the organic value of one carbon atom is set as 20, and the organic value is the value that numerically influences the influence of various substituents and bonds on the boiling point based on the set value. For example, the organic value of the nitro group (—NO$_2$) is 70.

An I/O value closer to 0 indicates a non-polar (hydrophobic, more organic) organic compound, and a larger value thereof indicates a polarity (hydrophilic, more inorganic) organic compound.

In the present disclosure, the I/O value of the water-soluble polymer means an I/O value that was determined by the following method. Based on organic (0 value) and inorganic (I value) described in Yoshio Koda, Organic Conceptual Diagram-Basics and Applications—(1984), page 13, and the like, an I/O value of each monomer constituting the water-soluble polymer (=I value/O value) is calculated. For each monomer constituting the polymer, a product of (I/O value) and (mol % in the polymer) is calculated, these are summed, and a product obtained by rounding to the second decimal place is calculated as an I/O value of the water-soluble polymer.

However, as a method of calculating the inorganic value of each monomer, a double bond is generally added as an inorganic value of 2, but since double bonds disappear in a case of polymerization, the I/O value of the water-soluble polymer is calculated by using the numerical value that does not add the double bond amount as the inorganic value of the monomer in the present disclosure.

In the present disclosure, the I/O value of the water-soluble polymer can be adjusted by adjusting the structure and a content rate of the monomer constituting the water-soluble polymer.

Specific examples of the water-soluble polymer used in the present disclosure are shown below, but the present disclosure is not limited thereto. In the following specific examples, the description in the columns of constitutional unit a-1 to constitutional unit a-4 represents the structure of each constitutional unit, the description of % by mass means the content of each constitutional unit, and the numerical value in the column of Mw represents the weight-average molecular weight, and the description of "-" means that the corresponding constitutional unit is not contained.

TABLE 1

| Specific resin | Constitutional unit a-1 | % by mass | Constitutional unit a-2 | % by mass | Constitutional unit a-3 | % by mass | Constitutional unit a-4 | % by mass | Weight-average molecular weight |
|---|---|---|---|---|---|---|---|---|---|
| SP-1 | C18MA | 10 | BzMA | 50 | MAA | 14 | HEMA | 26 | 30,000 |
| SP-2 | C18MA | 20 | BzMA | 39 | MAA | 14 | HEMA | 27 | 23,000 |
| SP-3 | C18MA | 30 | BzMA | 22 | MAA | 14 | HEMA | 34 | 20,000 |
| SP-4 | C18MA | 40 | BzMA | 20 | MAA | 14 | HEMA | 26 | 10,000 |
| SP-5 | C18MA | 20 | BzMA | 50 | MAA | 30 | — | — | 20,000 |
| SP-6 | C18MA | 20 | BzMA | 39 | MAA | 14 | HEMA | 27 | 22,000 |
| SP-7 | C18MA | 20 | BzMA | 39 | MAA | 14 | HEMA | 27 | 22,000 |
| SP-8 | C18MA | 20 | BzMA | 39 | MAA | 14 | HEMA | 27 | 22,000 |
| SP-9 | C18MA | 20 | BzMA | 41 | MAA | 19 | HEMA | 20 | 23,000 |
| SP-10 | C18MA | 30 | BzMA | 28 | MAA | 18 | HEMA | 24 | 20,000 |
| SP-11 | C18MA | 20 | BzMA | 38 | MAA | 12 | HEMA | 30 | 23,000 |
| SP-12 | C18MA | 30 | BzMA | 24 | MAA | 10 | HEMA | 36 | 20,000 |
| SP-13 | C18MA | 20 | BzMA | 36 | MAA | 9 | HEMA | 35 | 20,000 |
| SP-14 | C18MA | 20 | BzMA | 43 | MAA | 23 | HEMA | 14 | 23,000 |
| SP-15 | C18MA | 20 | BzMA | 34 | MAA | 14 | HEMA | 32 | 19,000 |
| SP-16 | C18MA | 20 | BzMA | 44 | MAA | 14 | HEMA | 22 | 20,000 |
| SP-17 | C18MA | 30 | BzMA | 31 | MAA | 14 | HEMA | 25 | 24,000 |
| SP-18 | C18MA | 30 | BzMA | 23 | MAA | 14 | HEMA | 33 | 35,000 |
| SP-19 | C18MA | 30 | BzMA | 23 | MAA | 14 | HEMA | 33 | 4,500 |
| SP-20 | C18MA | 20 | BzMA | 39 | MAA | 14 | HEMA | 27 | 23,000 |
| SP-21 | C18MA | 20 | BzMA | 50 | MAA | 14 | DMAAm | 16 | 18,000 |
| SP-22 | C18MA | 20 | BzMA | 41 | MAA | 14 | PME | 25 | 18,000 |
| SP-23 | C18MA | 20 | BzMA | 44 | MAA | 14 | DAAAm | 22 | 16,000 |
| SP-24 | C18MA | 20 | PEA | 30 | MAA | 30 | HEMA | 14 | 20,000 |
| SP-25 | C18MA | 20 | POB-A | 30 | MAA | 26 | HEMA | 14 | 20,000 |
| SP-26 | C18MA | 20 | St | 20 | MAA | 26 | HEMA | 14 | 20,000 |

TABLE 1-continued

| Specific resin | Constitutional unit a-1 | % by mass | Constitutional unit a-2 | % by mass | Constitutional unit a-3 | % by mass | Constitutional unit a-4 | % by mass | Weight-average molecular weight |
|---|---|---|---|---|---|---|---|---|---|
| SP-27 | C22MA | 20 | BzMA | 38 | MAA | 14 | HEMA | 28 | 20,000 |
| SP-28 | C12MA | 20 | BzMA | 38 | MAA | 14 | HEMA | 28 | 20,000 |
| SP-29 | C18MA | 15 | BzMA | 47 | MAA | 4 | HEMA | 34 | 20,000 |
| SP-30 | C18MA | 30 | BzMA | 32 | MAA | 5 | HEMA | 33 | 20,000 |
| SP-31 | C18MA | 40 | BzMA | 20 | MAA | 35 | HEMA | 5 | 20,000 |
| SP-32 | C18MA | 30 | BzMA | 50 | MAA | 12 | HEMA | 8 | 20,000 |
| SP-33 | C18MA | 19 | BzMA | 60 | MAA | 14 | HEMA | 7 | 20,000 |
| SP-34 | C18MA | 20 | BzMA | 29 | MAA | 20 | HEMA | 31 | 10,000 |
| SP-35 | C18MA | 28 | BzMA | 22 | MAA | 23 | HEMA | 27 | 30,000 |
| SP-36 | C18MA | 10 | BzMA | 50 | MAA | 14 | HEMA | 26 | 55,000 |
| SP-37 | C18MA | 30 | BzMA | 23 | MAA | 14 | HEMA | 33 | 40,000 |
| SP-38 | C18MA | 20 | BzMA | 45 | PPE | 25 | HEMA | 10 | 15,000 |
| SP-39 | C18MA | 20 | BzMA | 45 | AMPS | 15 | HEMA | 20 | 15,000 |
| SP-40 | C18MA | 10 | BzMA | 50 | MAA | 14 | HEMA | 26 | 10,000 |
| SP-41 | C18MA | 20 | BzMA | 39 | MAA | 14 | HEMA | 27 | 22,000 |
| SP-42 | CyHMA | 20 | BzMA | 39 | MAA | 14 | HEMA | 27 | 22,000 |
| SP-43 | OctMA | 20 | BzMA | 39 | MAA | 14 | HEMA | 27 | 22,000 |
| SP-44 | 2-EHMA | 20 | BzMA | 39 | MAA | 14 | HEMA | 27 | 22,000 |

The details of the structures described by abbreviations in Table 1 are as follows. In the following structure, n represents the number of repetitions.

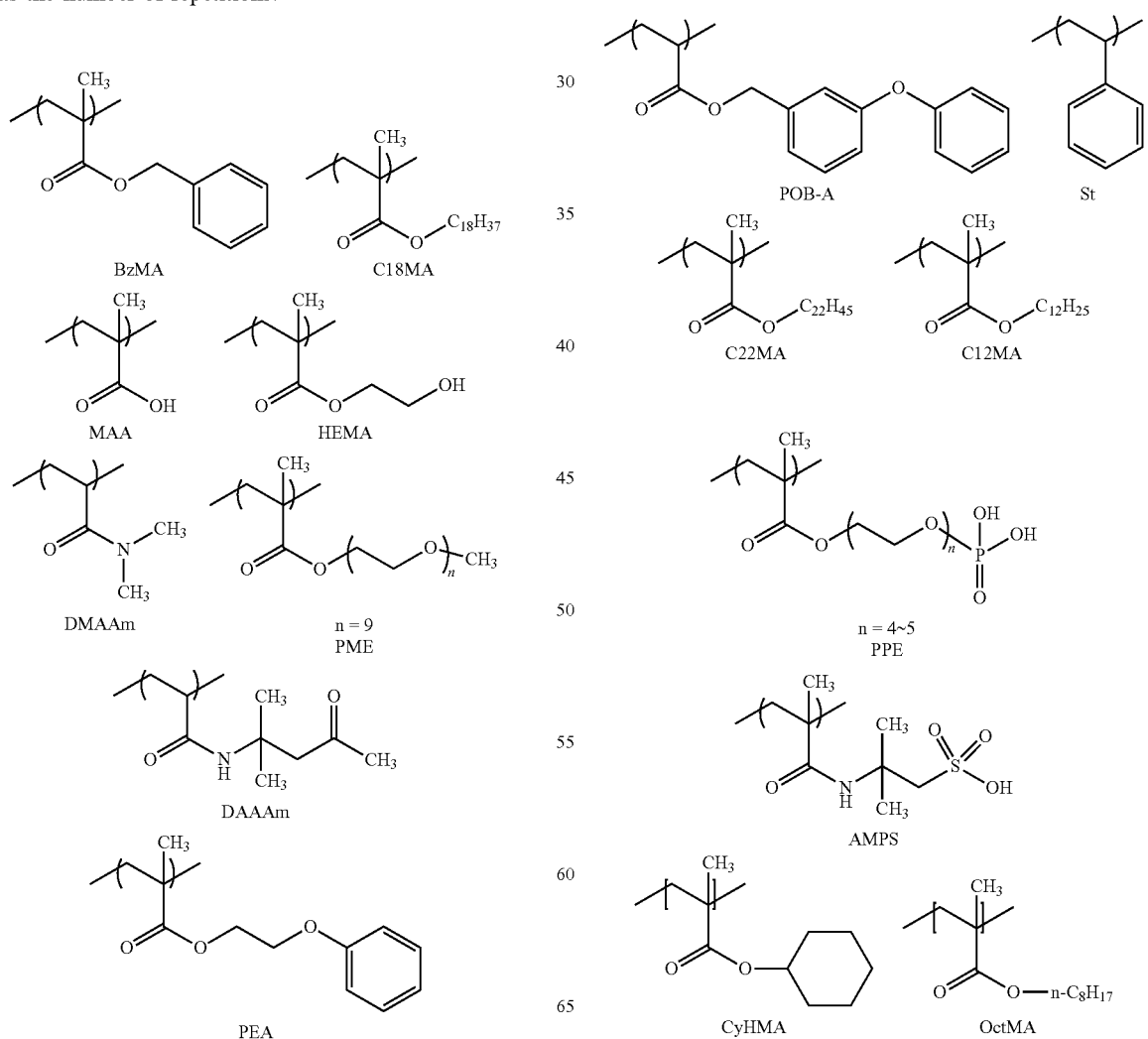

-continued

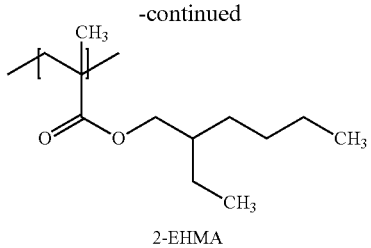

2-EHMA

<Pigment>

The ink of the present disclosure includes a pigment dispersed in the above water-soluble polymer.

The pigment used in the present disclosure is not particularly limited, but it is preferable to contain at least one pigment selected from the group consisting of carbon black, a perinone-based pigment, and a perylene-based pigment.

The perinone-based pigment and the perylene-based pigment are not particularly limited as long as they are pigments having a perinone structure or a perylene structure, but the perinone-based pigment is preferable from the viewpoints of sedimentation inhibiting properties and aggregation inhibiting properties and of reducing an average particle size.

Examples of perinone-based pigments include C.I. (Color Index) Pigment Orange (Pigment Orange) 43, C.I. Pigment Red 194, and the like.

Examples of perylene-based pigments include C.I. Pigment Red 123, C.I. Pigment Red 149, C.I. Pigment Red 178, C.I. Pigment Red 179, C.I. Pigment Red 189, C.I. Pigment Red 190, C.I. Pigment Black 31, and the like.

From the viewpoints of sedimentation inhibiting properties and aggregation inhibiting properties and of reducing an average particle size, as the above-mentioned pigment used in the present disclosure, at least one pigment selected from the group consisting of C. I. Pigment Orange 43, C. I. Pigment Red 194, C. I. Pigment Red 123, C. I. Pigment Red 149, C. I. Pigment Red 178, C. I. Pigment Red 179, C. I. Pigment Red 189, C. I. Pigment Red 190, and C. I. Pigment Black 31 is preferable; at least one pigment selected from the group consisting of C. I. Pigment Orange 43, C. I. Pigment Red 194, C. I. Pigment Red 149, C. I. Pigment Red 178, and C. I. Pigment Red 179 is more preferable; and at least one pigment selected from the group consisting of C. I. Pigment Orange 43 and C.I. I. Pigment Red 194 is even more preferable. In a case where it is contained in the ink, it is particularly preferable to contain C. I. Pigment Orange 43 from the viewpoint that it is more difficult to improve the sedimentation inhibiting properties and the aggregation inhibiting properties, and that the problem of the present disclosure appears more significantly.

The volume average particle size of the pigment in the ink according to the present disclosure is preferably 80 nm to 180 nm, more preferably 100 nm to 145 nm, and even more preferably 100 nm to 137 nm, from the viewpoint of sedimentation inhibiting properties and aggregation inhibiting properties.

The volume average particle size of the pigment in the ink is determined by measuring with a dynamic light scattering method using a nanotrac particle size distribution measuring apparatus UPA-EX150 (manufactured by Nikkiso Co., Ltd.).

Furthermore, the arithmetic average particle size of the pigment in the ink can be measured by observation with a transmission electron microscope (TEM). Specifically, a diluted dispersion is added dropwise on Cu200 mesh to which a carbon film is attached, and then dried, and thereafter, major axises of 300 independent particles that do not overlap are measured from an image enlarged 100,000 times with TEM (1200EX (trade name) manufactured by JEOL Ltd.), and an average value thereof is calculated as an average particle size.

The pigments may be contained alone or in combination of two or more kinds thereof.

Furthermore, the ink according to the present disclosure may include a pigment other than the perinone-based pigment and the perylene-based pigment, but the content thereof is preferably 50 parts by mass or less, more preferably 10 parts by mass or less, even more preferably 1 part by mass or less with respect to 100 parts by mass of the total content of the perinone-based pigment and the perylene-based pigment.

The content of the above pigment in the ink according to the present disclosure is not particularly limited, and it is preferably 1% by mass to 20% by mass, more preferably 1% by mass to 10% by mass, and even more preferably 2% by mass to 8% by mass with respect to the total mass of the ink. In a case of using 2 or more kinds of the pigments, the content thereof means the total content of 2 or more kinds thereof.

It is preferable that the pigment be contained in an amount of 2.0% by mass to 7.5% by mass and the alkali metal salt be contained in an amount of 0.15% by mass to 1.0% by mass with respect to the total mass of the ink. Thereby, the jettability, sedimentation inhibiting properties, and aggregation inhibiting properties are further improved.

It is more preferable that the pigment be contained in an amount of 2.0% by mass to 5.0% by mass, and the alkali metal salt be contained in an amount of 0.15% by mass to 0.5% by mass, with respect to the total mass of the ink. It is even more preferable that the pigment be contained in an amount of 2.5% by mass to 4.5% by mass and the alkali metal salt be contained in an amount of 0.2% by mass to 0.3% by mass with respect to the total mass of the ink.

The ratio of the pigment content to the total mass of the alkali metal salt is preferably 2 to 30. In a case where the ratio of the content of the pigment to the total mass of the alkali metal salt is 2 or more, the balance between the anion of the dispersant and the cation of the alkali metal can be maintained, and the dispersion stable state can be maintained. In a case where the ratio of the pigment content to the total mass of the alkali metal salt is 30 or less, the cation layer can be formed, and the sedimentation inhibiting properties and jettability can be further improved. The ratio of the content of the pigment to the total mass of the alkali metal salt is more preferably 5 to 20, and even more preferably 10 to 20.

<Water-Soluble Organic Solvent>

The ink according to the present disclosure contains a water-soluble organic solvent, and the content of the water-soluble organic solvent is 18% by mass or less with respect to the total mass of the ink.

In a case where the content of the water-soluble organic solvent is 18% by mass or less with respect to the total mass of the ink, drying properties of the ink when it is jetted is excellent, and scratch resistance of an image to be obtained can be improved.

The content of the water-soluble organic solvent with respect to the total mass of the ink is preferably 10% by mass or more. As a result, it is possible to maintain better ink jettability.

From the above viewpoint, the content of the water-soluble organic solvent with respect to the total mass of the ink is preferably 11% by mass to 16.5% by mass, more preferably 12% by mass to 16% by mass, and even more preferably 12% by mass to 14% by mass.

The boiling point of the water-soluble organic solvent is preferably 180° C. to 300° C.

In a case where the boiling point of the water-soluble organic solvent is 180° C. or higher, favorable ink jettability can be maintained. In a case where the boiling point of the water-soluble organic solvent is 300° C. or lower, drying properties can be improved, and favorable scratch resistance for images can be kept.

From the same viewpoint as above, the boiling point of the water-soluble organic solvent is more preferably 180° C. to 250° C., and even more preferably 180° C. to 220° C.

The boiling point in the present disclosure is a value measured by a boiling point meter, and can be measured using, for example, DosaTherm300 manufactured by Titan Technologies, Inc.

The boiling point means the boiling point under 1 atm (101325 Pa).

Examples of the water-soluble organic solvent include alcohol compounds, ketone compounds, ether compounds, amide compounds, nitrile compounds, and sulfone compounds.

Examples of the alcohol compound include ethanol, isopropanol, n-butanol, t-butanol, isobutanol, diacetone alcohol, diethylene glycol, ethylene glycol, dipropylene glycol, propylene glycol, and glycerin.

Examples of the ketone compound include acetone, methyl ethyl ketone, diethyl ketone, and methyl isobutyl ketone.

Examples of the ether compound include tetrahydrofuran and dioxane.

Examples of the amide compound include dimethylformamide and diethylformamide.

Examples of the nitrile compound include acetonitrile.

Examples of the sulfone compound include dimethyl sulfoxide, dimethyl sulfone, and sulfolane.

The ink according to the present disclosure may contain one kind of water-soluble organic solvent, or may use two or more kinds thereof in combination. In a case where the ink according to the present disclosure uses two or more kinds of the water-soluble organic solvent in combination, the above content means the total content of the water-soluble organic solvents.

(Polymer Resin Particles)

The ink of the present disclosure preferably further contains polymer resin particles. By containing polymer resin particles, image strength can be improved, and scratch resistance can be improved. In addition, since ink droplets spread on a paper medium after landing, it is possible to record an image with a desired color density without curling or deformation due to cockling while reducing an amount of a jetted ink.

Polymer resin particles disclosed in JP2016-194007A can be used as the polymer resin particles in the present disclosure.

The polymer resin particles may be used, for example, in the form of a latex which is a dispersion in which the polymer resin particles are dispersed in water.

The ink of the present disclosure preferably contains, as polymer resin particles, at least particles of a resin having a structural unit represented by the following General Formula a or General Formula b. The resin forming the polymer resin particles may have a structure having the structural unit represented by General Formula a and not having the structural unit represented by General Formula b, or may have a structure having the structural unit represented by General Formula b and not having the structural unit represented by General Formula a. Furthermore, a structure having both the structural unit represented by General Formula a and the structural unit represented by General Formula b may be used.

As the polymer resin particles in the present disclosure, it is preferable that the resin have at least one selected from a structural unit represented by General Formula a or a structural unit represented by General Formula b, and it is more preferable that the resin have the structural unit represented by General Formula a.

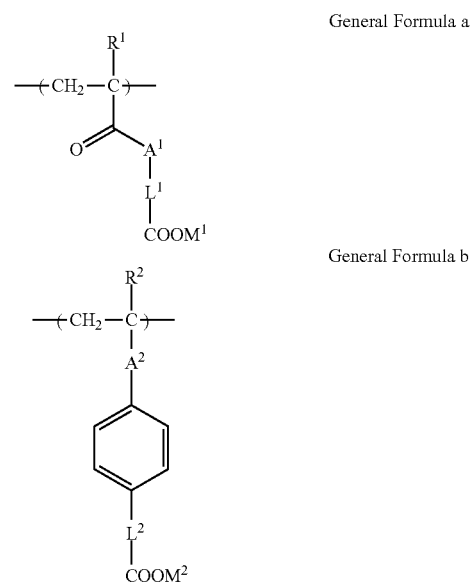

General Formula a

General Formula b

In General Formula a, $R^1$ represents a hydrogen atom or an alkyl group having 1 to 4 carbon atoms. $R^1$ is preferably a hydrogen atom or a methyl group, and more preferably a methyl group.

$A^1$ represents an oxygen atom or $NR^3$. $R^3$ represents a hydrogen atom or an alkyl group having 1 to 4 carbon atoms. As $A^1$, $NR^3$ is preferable, and NH is more preferable.

$L^1$ represents an alkylene group having 6 to 22 carbon atoms. An alkylene group represented by $L^1$ may be linear or branched, and is preferably linear from the viewpoint of jetting stability and stability of polymer resin particles. $L^1$ is preferably an alkylene group having 8 to 22 carbon atoms, more preferably an alkylene group having 8 to 18 carbon atoms, even more preferably an alkylene group having 8 to 16 carbon atoms, still more preferably an alkylene group having 8 to 14 carbon atoms, further more preferably an alkylene group having 10 to 12 carbon atoms, and particularly preferably an alkylene group having 11 carbon atoms.

$M^1$ represents a hydrogen ion, an alkali metal ion, or an ammonium ion. From the viewpoint of jetting stability and stability of polymer resin particles, $M^1$ is preferably an alkali metal ion, more preferably a sodium ion or a potassium ion, and even more preferably a potassium ion.

Furthermore, in General Formula b, $R^2$ and $M^2$ have the same meanings as $R^1$ and $M^1$ in General Formula a, respectively, and the preferable forms thereof are also the same.

$A^2$ represents a single bond, —COO—, or —CONH—, and a single bond is preferable.

$L^2$ represents a divalent linking group having 6 to 23 carbon atoms. The divalent linking group represented by $L^2$ is not particularly limited, and from the viewpoint of synthesis, —C(=O)NR⁴—(CH₂)n- or —C(=O)O—(CH₂)n- is preferable, and —C(=O)NR⁴—(CH₂)n- is more preferable. $R^4$ represents a hydrogen atom or an alkyl group having 1 to 4 carbon atoms, and is preferably a hydrogen atom. In addition, n represents an integer of 5 to 22, preferably 6 to 18, more preferably 7 to 15, even more preferably 8 to 14, particularly preferably 10 to 12, and most preferably 11.

A total content rate of the structural unit represented by General Formula a or General Formula b in the resin forming the polymer resin particles is preferably within a range of 0.5% by mass or more and 30% by mass or less from the viewpoints of image quality, jettability, and stability of the polymer resin particles. In other words, in a case where the resin forming the polymer resin particles does not have the structural unit represented by General Formula a, a content rate of the structural unit represented by General Formula b is within the above range; in a case where the resin does not have the structural unit represented by General Formula b, a content rate of the structural unit represented by General Formula a is preferably within the above range; and in a case where the resin has both the structural units represented by General Formula a and General Formula b, a total content rate of both the structural units is preferably within the above range. Furthermore, a total content rate of the structural unit represented by General Formula a or General Formula b in the resin forming the polymer resin particles is more preferably within a range of 1% by mass to 20% by mass, and even more preferably within a range of 1% by mass to 5% by mass for the same reason as described above.

In the resin forming the polymer resin particles, structural units other than the structural unit represented by General Formula a or General Formula b (hereinafter, simply referred to as "other structural units") are not particularly limited, and they can be selected appropriately. Suitable examples of other structural units include structural units disclosed in JP2001-181549A and JP2002-088294A.

Specific examples of other structural units include structural units derived from a monomer selected from a (meth) acrylic acid alkyl ester in which an alkyl group has 1 to 20 carbon atoms (preferably 1 to 15 and more preferably 1 to 12), aromatic ring-containing (meth)acrylate, alicyclic (meth)acrylate, a styrene compound, alkyl (meth)acrylamide, and (meth)acrylonitrile.

As a (meth)acrylic acid alkyl ester, specific examples of alkyl (meth)acrylates include alkyl (meth)acrylates such as methyl (meth)acrylate, ethyl (meth)acrylate, isopropyl (meth)acrylate, n-propyl (meth)acrylate, n-butyl (meth) acrylate, isobutyl (meth)acrylate, t-butyl (meth)acrylate, hexyl (meth)acrylate, and ethylhexyl (meth)acrylate; hydroxyalkyl (meth)acrylates such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; alkylaminoalkyl(meth)acrylates such as dimethylaminoethyl(meth)acrylate, diethylaminoethyl(meth)acrylate, and t-butylaminoethyl(meth)acrylate; and the like.

Examples of aromatic ring-containing (meth)acrylates include benzyl (meth)acrylate, phenoxyethyl (meth)acrylate, and the like.

Examples of alicyclic (meth)acrylates include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, cyclodecyl (meth)acrylate, isobornyl (meth) acrylate, norbornyl (meth)acrylate, adamantyl (meth)acrylate, dicyclopentanyl (meth)acrylate, dicyclopentenyloxyethyl (meth)acrylate, and the like.

Examples of styrene compounds include styrene, α-methylstyrene, chlorostyrene, and the like.

Examples of alkyl (meth)acrylamides include N-hydroxyalkyl(meth)acrylamides such as N-hydroxymethyl (meth) acrylamide, N-hydroxy ethyl (meth)acrylamide, and N-hydroxybutyl (meth)acrylamide; N-alkoxyalkyl (meth) acrylamide s such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl(meth)acrylamide, and N-(n-,iso)butoxy ethyl (meth)acrylamide; and the like.

The resin forming the polymer resin particles may have two or more kinds of the above structural units as the other structural units.

Among the above, as the other structural units, a structural unit derived from a (meth)acrylic acid alkyl ester and a structural unit derived from a monomer selected from styrene compounds are preferable.

Among them, the resin forming the polymer resin particles preferably has a structural unit (hereinafter referred to as a "structural unit (i)") derived from an alkyl (meth) acrylate in which an alkyl group has 2 to 15 carbon atoms (preferably 4 to 12 and more preferably 4 to 10) as the other structural unit. A content rate of the structural unit (i) in the resin of the polymer resin particles is preferably 5% by mass to 90% by mass, more preferably 10% by mass to 70% by mass, even more preferably 20% by mass to 55% by mass, still more preferably 25% by mass to 50% by mass, and particularly preferably 30% by mass to 45% by mass.

The resin forming the polymer resin particles also preferably has a structural unit derived from a methyl (meth) acrylate as the other structural unit. In this case, a content rate of the structural unit derived from a methyl (meth) acrylate in the resin of the polymer resin particles is preferably 5% by mass to 90% by mass, more preferably 10% by mass to 85% by mass, even more preferably 20% by mass to 80% by mass, still more preferably 30% by mass to 70% by mass, and particularly preferably 40% by mass to 60% by mass.

Among them, it is preferable that the resin forming the polymer resin particles have the structural unit (i) as the other structural unit and also have the structural unit derived from a methyl (meth)acrylate. By having the structural unit derived from a methyl (meth)acrylate, a yield in a case where the polymer resin particles are prepared can be improved, and a glass transition temperature (Tg) of the polymer resin particles can be adjusted to an appropriate range. Accordingly, film quality of recorded images is improved.

The polymer resin particles can be prepared by an emulsion polymerization method or a phase-transfer emulsification method.

The emulsion polymerization method is a method in which polymer resin particles are prepared by polymerizing an emulsion prepared by adding a monomer, a polymerization initiator, an emulsifier, and a chain transfer agent as necessary to an aqueous medium (for example, water). In a case where the emulsion polymerization method is applied to the preparation of the polymer resin particles, a monomer inducing the structural unit represented by General Formula a and a monomer inducing the structural unit represented by General Formula b also function as emulsifiers. Accordingly, it is not necessary to separately mix an emulsifier other than the monomers that induce the structural unit represented by General Formula a or General Formula b, but a known conventional emulsifier may be added separately as long as jettability and image quality in a case of preparing the ink do not deteriorate.

The emulsion polymerization method is suitable for preparing polymer resin particles having a volume average particle size of 30 nm or more.

The phase-transfer emulsification method is a method in which a water-insoluble polymer, an organic solvent, and a neutralizing agent, as necessary, are mixed in an aqueous medium (for example, water), a dispersion is obtained through a step of stirring, and thereafter, an organic solvent is distilled off from the dispersion by a conventional method such as distillation under reduced pressure, and a phase is converted into an aqueous dispersion. The obtained aqueous dispersion is substantially free of an organic solvent, and an amount of the organic solvent in the dispersion is preferably 0.2% by mass or less, and is more preferably 0.1% by mass or less.

In this case, the resin of the polymer resin particles is preferably a resin having at least one of a structural unit having an aromatic group and a structural unit having an alicyclic group. The alicyclic group has the same meaning as a cycloaliphatic group. As the structural unit having an aromatic group, a structural unit derived from a (meth) acrylate monomer having an aromatic group is preferable, and examples thereof include a structural unit derived from phenoxyethyl (meth)acrylate, benzyl (meth)acrylate, phenyl (meth)acrylate, or the like. As the structural unit having an alicyclic group, a structural unit derived from a bicyclic or tricyclic or more alicyclic (meth)acrylate having an alicyclic group is preferable, and examples thereof include a structural unit derived from isobornyl (meth)acrylate, adamantyl (meth)acrylate, or dicyclopentanyl (meth)acrylate.

Among them, a preferable aspect of the polymer resin particles (for example, self-dispersing polymer resin particles) is a vinyl polymer which contains 20% by mass to 90% by mass of a structural unit derived from an alicyclic (meth)acrylate (preferably a bicyclic or tricyclic or more polycyclic (meth)acrylate), 25% by mass or less of a structural unit derived from a dissociative group-containing monomer (preferably anionic dissociative group, and more preferably a carboxyl group, a phosphoric acid group, a sulfonic acid group, and the like), and at least one structural unit derived from a (meth)acrylate having a chain alkyl group having 1 to 8 carbon atoms, and in which an acid value is 20 mgKOH/g to 120 mgKOH/g (more preferably 25 mgKOH/g to 100 mgKOH/g), a weight-average molecular weight is 3,000 to 200,000 (preferably 10,000 to 200,000).

The polymer resin particles in the present disclosure are preferably self-dispersing polymer resin particles.

The self-dispersing polymer resin particles are particles consisting of a water-insoluble resin that can be in a state of being dispersed in an aqueous medium due to a functional group (particularly, an acidic group or a salt of an acidic group) of the resin itself. The phrase "state of being dispersed" includes both an emulsified state in which a water-insoluble resin is dispersed in an aqueous medium in a liquid state (emulsion), and a dispersed state in which a water-insoluble resin is dispersed in an aqueous medium in a solid state (suspension).

In addition, the term "water-insoluble" means that an amount dissolved in 100 parts by mass of water (25° C.) is 5.0 parts by mass or less.

A weight-average molecular weight of the resin of the polymer resin particles is preferably 100,000 to 1,000,000, and more preferably 200,000 to 600,000.

The weight-average molecular weight (Mw) of the resin of the polymer resin particles is a value calculated as a polystyrene conversion value by gel permeation chromatography (GPC) under the following conditions. A calibration curve is produced from "standard sample TSK standard, polystyrene" manufactured by Tosoh Corporation: eight samples of "F-40," "F-20," "F-4," "F-1," "A-5000," "A-2500," "A-1000," and "n-propylbenzene."

~Condition~

Measurement apparatus: High-speed GPC HLC-8020 GPC (manufactured by Tosoh Corporation)

Detector: Differential Refractometer (RI) RI-8020 (manufactured by Tosoh Corporation)

Column: Three TSKgel Super Multipore HZ-H (4.6 mmID×15 cm, manufactured by Tosoh Corporation) is used.

Column temperature: 40° C.

Eluent: tetrahydrofuran (THF)

Sample concentration: 0.45% by mass

Injection volume: 10 μL

Flow rate: 0.35 mL/min

A volume average particle size of the polymer resin particles is preferably 30 nm or more, is more preferably within a range of 30 nm or more and 1 μm or less, is even more preferably within a range of 30 nm or more and 300 nm or less, and is particularly preferably within a range of 30 nm or more and 150 nm or less. In a case where the volume average particle size of the polymer resin particles is 30 nm or more, a viscosity of the polymer resin particles is reduced due to aggregation in a case where ink droplets land, and the ink droplets easily spread. Furthermore, a color density and film quality of the recorded image are more excellent.

A method of adjusting the volume average particle size is not particularly limited, and for example, a particle size can be easily adjusted to 30 nm or more by an emulsion polymerization method.

In addition, a particle size distribution of the polymer resin particles is not particularly limited, and it may be a wide particle size distribution or a monodisperse particle size distribution. Two or more kinds of the polymer resin particles having a monodisperse particle size distribution may be mixed and used.

A volume average particle size and a particle size distribution are values measured by a dynamic light scattering method using a nanotrac particle size distribution measurement apparatus UPA-EX150 (manufactured by Nikkiso Co., Ltd.).

A glass transition temperature (Tg) of the polymer resin particles is preferably 40° C. or higher, and more preferably 50° C. or higher. Tg is preferably 80° C. or lower. In a case where a Tg is 40° C. or higher, it is difficult to form a film due to the polymer resin particles in an ink jet head, and thus it is easy to maintain favorable jetting stability. Furthermore, film quality of images can be strongly retained, and scratches and color transfer to an object to be abraded are less likely to occur during rubbing. In a case where a Tg is 80° C. or less, an ink having favorable film-forming properties can be easily obtained, and image quality of images is also excellent.

Among them, a Tg is more preferably within a range of 40° C. or higher and 60° C. or lower.

An actually measured Tg is applied to the glass transition temperature of the polymer resin particles. Specifically, the measured Tg is a value measured by a differential scanning calorimeter (DSC) EXSTAR 6220 manufactured by SII Nano Technology Inc. As the measurement conditions, a sample amount of 5 mg is sealed in an aluminum pan, and a peak top value of DSC of the measurement data at the time of the second temperature increase is applied in the nitrogen atmosphere in the following temperature profile.

30° C.→−50° C. (cooled at 50° C./min)
−50° C.→220° C. (temperature rise at 20° C./min)
220° C.→−50° C. (cooled at 50° C./min)
−50° C.→220° C. (temperature rise at 20° C./min)

Among the above, as the polymer resin particles, polymer resin particles having a glass transition temperature Tg of 40° C. or higher and a volume average particle size of 30 nm or more are preferable from the viewpoint of deformation of a paper medium, jetting stability, and film quality.

A content of the polymer resin particles with respect to the total mass of the ink is preferably 3.0% by mass to 15.0% by mass. By incorporating 3.0% by mass or more of the polymer resin particles with respect to the total mass of the ink, scratch resistance can be further improved.

By incorporating the polymer resin particles in an amount of 15.0% by mass or less with respect to the total mass of the ink, it is possible to record an image having a desired color density without curling or deformation due to cockling while reducing an amount of a jetted ink.

From the same viewpoint as above, a content of the polymer resin particles with respect to the total mass of the ink is more preferably 4% by mass to 10% by mass, and more preferably 6% by mass to 8% by mass.

<Water>

The ink according to the present disclosure can contain water.

The content of water is not particularly limited, but it is preferably 10% by mass to 99% by mass, more preferably 30% by mass to 80% by mass, and even more preferably 50% by mass to 70% by mass with respect to the total mass of the ink.

The ink according to the present disclosure may include other additives.

The ink according to the present disclosure is excellent not only in the sedimentation inhibiting properties and aggregation inhibiting properties of the pigment but also in the jetting stability of ink jet, and thereby an image having a high image density can be formed.

<Other Additives>

The ink according to the present disclosure can be configured by using other additives in addition to the above components. Examples of other additives include known additives such as water-soluble polymerizable compounds, polymerization initiators, resin particles, antifading agents, emulsion stabilizers, penetration enhancers, ultraviolet absorbers, preservatives, antibacterial agents, pH adjusters, surface tension adjusters, defoamers, viscosity-adjusting agents, dispersants, dispersion stabilizers, rust inhibitors, and chelating agents. These various additives are added directly to the ink.

A water-soluble polymerizable compound can improve the adhesion of images. For the preferable form of the water-soluble polymerizable compound, the description in paragraphs 0037 to 0061 of JP2011-231315A can be appropriately referred to.

In a case where the polymerization initiator is added together with the water-soluble polymerizable compound, rub resistance of the image can be improved, and it is advantageous for high-speed recording. For the preferable form of the initiator, the description in paragraphs 0062 to 0065 of JP2011-231315A can be appropriately referred to.

An ultraviolet absorber can improve the storability of the image. As ultraviolet absorbers, it is also possible to use benzotriazole compounds disclosed in JP1983-185677A (JP-S58-185677A), JP1986-190537A (JP-S61-190537A), JP1990-000782A (JP-H2-000782A), JP1993-197075A (JP-H5-197075A), and JP1997-034057A (JP-H9-034057A); benzophenone compounds disclosed in JP1971-002784A (JP-S46-002784A), JP1993-194483A (JP-H5-194483A), U.S. Pat. No. 3,214,463A, and the like; cinnamic acid compounds disclosed in JP1973-030492B (JP-S48-030492B), JP1981-021141B (JP-S56-021141B), JP1998-088106A (JP-H10-088106A), and the like; triazine compounds disclosed in JP1992-298503A (JP-H4-298503A), JP1996-053427A (JP-H8-053427A), JP1996-239368A (JP-H8-239368A), JP1998-182621A (JP-H10-182621A), JP1996-501291A (JP-H8-501291A), and the like; compounds disclosed in Research Disclosure No. 24239; and compounds that fluoresce by absorbing ultraviolet light, typified by stilbene-based and benzoxazole-based compounds, so-called optical brighteners.

An antifading agent can improve the storability of images. Examples of antifading agents include various organic and metal complex antifading agents. Examples of organic antifading agents include hydroquinones, alkoxyphenols, dialkoxyphenols, phenols, anilines, amines, indanes, chromans, alkoxyanilines, heterocycles, and the like. Examples of metal complex antifading agents include nickel complex, zinc complex, and the like. More specifically, it is possible to use compounds disclosed in I or J section of Item VII of Research Disclosure No. 17643, Research Disclosure No. 15162, left column in page 650 of Research Disclosure No. 15162. 18716, page 527 of Research Disclosure No. 36544, page 872 of Research Disclosure No. 307105, and the patent cited in Research Disclosure No. 15162; and compounds included in the general formulas and the compound examples of the representative compounds disclosed in pages 127 to 137 of JP1987-215272A (JP-S62-215272A).

Examples of antibacterial agents include sodium dehydroacetate, sodium benzoate, sodium pyridinethione-1-oxide, p-hydroxybenzoic acid ethyl ester, 1,2-benzisothiazolin-3-one and salts thereof, and the like. The content of the antibacterial agent is preferably in the range of 0.02% by mass to 1.00% by mass with respect to the total mass of the ink.

As a pH adjuster, a neutralizing agent (organic base, inorganic alkali) can be used. The pH adjuster can improve the storage stability of the ink. The pH adjuster is preferably added so that a pH of the ink is 6 to 10, and the pH adjuster is more preferably added so that the pH of the ink is 7 to 10.

Examples of surface tension adjusters include nonionic surfactants, cationic surfactants, anionic surfactants, betaine surfactants, and the like.

As an amount of the surface tension adjuster added, a range in which surface tension of the ink can be adjusted to 20 mN/m to 60 mN/m is preferable, a range in which surface tension of the ink can be adjusted to 20 mN/m to 45 mN/m is more preferable, and a range in which surface tension of the ink can be adjusted to 25 mN/m to 40 mN/m is even more preferable. In a case where an addition amount is within the range, favorable droplet jetting can be performed by an ink jet technique.

As specific examples of hydrocarbon surfactants, the following are preferable: anionic surfactants such as fatty acid salt, alkyl sulfate ester salt, alkyl benzene sulfonate, alkyl naphthalene sulfonate, dialkyl sulfosuccinate, alkyl phosphate ester salt, naphthalene sulfonate formalin condensate, and polyoxyethylene alkyl sulfate ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerin fatty acid ester, and an oxyethyleneoxypropylene block copolymer.

Furthermore, amine oxide type amphoteric surfactants such as N, N-dimethyl-N-alkylamine oxide are also preferable.

Furthermore, it is possible to use those exemplified as surfactants in pages 37 and 38 of JP1984-157636A (JP-S59-157636A), and Research Disclosure No. 308119 (1989).

Furthermore, by using a fluorine (fluorinated alkyl) surfactant, a silicone surfactant, and the like disclosed in JP2003-322926A, JP2004-325707A, and JP2004-309806A, scratch resistance can also be improved.

Among these surfactants, nonionic surfactants are preferable, and compounds having an acetylene diol group are more preferable, from the viewpoint that wettability of the pigment surface can be further improved, and dispersibility of a mixed liquid can be improved.

The compound having an acetylene diol group used in the present disclosure is more preferably an ethylene oxide adduct of acetylene diol.

Specific examples of compounds having an acetylene diol group include 2,4,7,9-tetramethyl-5-decyne-4,7-diol, 3,6-dimethyl-4-octyne-3,6-diol, 3,5-dimethyl-1-hexyne-3-ol, and the like.

Furthermore, as the compound having an acetylene diol group, a commercially available product can be used. Specific examples include SURFYNOL82, 465, and 485, DYNOL 604 and 607, all of which are manufactured by Air Products & Chemicals; OLFINE STG and OLFINE E1010 manufactured by Nissin Chemical Co., Ltd.; and the like.

The amount of the surfactant added is preferably 30 parts by mass to 100 parts by mass, and more preferably 5 parts by mass to 30 parts by mass with respect to 100 parts by mass of the total amount of the pigment.

A Hydrophile-Lipophile Balance (HLB) value of the surfactant is preferably 6 to 13, and more preferably 8 to 13.

A HLB is a value calculated from the HLB value of GRIFFIN (20 Mw/M, Mw=molecular weight of hydrophilic site, M=molecular weight of nonionic surfactant).

<Characteristics of Ink>

[Viscosity]

The viscosity of the ink according to the present disclosure is not particularly limited, but a viscosity at 25° C. is preferably 1.2 mPa·s to 15.0 mPa·s, is more preferably 2 mPa·s or more and less than 13 mPa·s, and even more preferably 2.5 mPa·s or more and less than 10 mPa·s. The viscosity of the ink is measured at 25° C. using a TV-22 type viscometer (manufactured by Toki Sangyo Co., Ltd.).

[PH]

The pH of the ink according to the present disclosure at 25° C. is preferably 6 to 11 from the viewpoint of dispersion stability. In a case where the ink is used as an ink set containing an acidic treating agent, it is preferable that the ink aggregates at a high speed by contact with a treating agent containing an acidic compound or the like. Accordingly, the pH at 25° C. of the ink according to the present disclosure is more preferably 7 to 10, and even more preferably 7 to 9.

In the present disclosure, the pH can be measured using a pH meter WM-50EG (manufactured by Toa DDK).

(Method for Producing Ink)

A method for producing an ink for ink jet recording according to the present disclosure includes a step of mixing a pigment, a water-soluble polymer for dispersing the pigment, an alkali metal salt, and a water-soluble organic solvent.

The ink according to the present disclosure is preferably produced by the method for producing an ink for ink jet recording according to the present disclosure.

In the mixing step, the order of mixing the pigment, water, the specific resin, and the specific compound is not particularly limited.

A method of mixing the components in the mixing step is not particularly limited.

The mixing of the respective components in the mixing step can be carried out using a two-roll, three-roll, ball mill, tron mill, disper, kneader, cokneader, homogenizer, blender, single-screw or twin-screw extruder, or the like.

For details of kneading and dispersion, descriptions in "Paint Flow and Pigment Dispersion" by T. C. Patton (Published by John Wiley and Sons in 1964), and the like are referred to.

Furthermore, from the viewpoint of reducing an average particle size, the method for producing an ink according to the present disclosure preferably includes, before the mixing step, a step of salt milling at least one pigment selected from the group consisting of a perinone-based pigment and a perylene-based pigment.

The salt milling treatment is, for example, a treatment in which a mixture containing the above pigment, a water-soluble inorganic salt, and a water-soluble organic solvent is charged into a kneading machine, and the mixture is kneaded and ground.

As the water-soluble inorganic salt, a commonly used water-soluble inorganic salt can be used without particular limitation. Specifically, for example, it is preferable to use an inorganic salt such as sodium chloride, potassium chloride, sodium sulfate, and potassium sulfate.

An average particle size of the water-soluble inorganic salt used is preferably 0.5 μm to 50 μm, more preferably 1 μm to 20 μm, and even more preferably 1 μm to 10 μm.

An amount of the water-soluble inorganic salt used is preferably 1 time by mass to 30 times by mass, more preferably 3 times by mass to 20 times by mass, and even more preferably 5 times by mass to 15 times by mass with respect to the amount of the pigment used from the viewpoint of productivity.

As the water-soluble organic solvent, a water-soluble organic solvent that is soluble in water and does not substantially dissolve the pigment and the water-soluble inorganic salt is preferable, and because a solvent is likely to evaporate due to the temperature increase during kneading, solvents having a high boiling point are preferable from the viewpoint of safety. The water-soluble organic solvent can be used to adjust the hardness of the mixture containing a crude azo pigment and the water-soluble inorganic salt to a level applicable to kneading. Examples of such water-soluble organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, or a mixture thereof.

An amount of the water-soluble organic solvent used is preferably 0.1 times by mass to 5 times by mass the amount of the pigment used.

A kneading temperature is preferably 20° C. to 130° C., particularly preferably 40° C. to 110° C.

As a kneading machine, for example, a kneader, a mix muller, or the like can be preferably used.

An arithmetic average particle size of the pigment obtained by the salt milling treatment is preferably 50 nm to 180 nm, more preferably 70 nm to 145 nm, even more preferably 80 nm to 120 nm, and particularly preferably 90 nm to 100 nm from the viewpoints of sedimentation inhibiting properties and aggregation inhibiting properties.

As an average primary particle size of the above-mentioned pigment, major axises of 300 independent particles that do not overlap are measured from an image enlarged 100,000 times with TEM (1200EX (trade name) manufactured by JEOL Ltd.), and an average value thereof is calculated as an arithmetic average particle size.

(Ink)

The ink produced by the method for producing an ink of the present disclosure is the same as the above-mentioned ink, and the water-soluble polymer, pigment, alkali metal salt, and water-soluble organic solvent are also the same as the above-mentioned water-soluble polymer, pigment, alkali metal salt, and water-soluble organic solvent.

[Usage Applications]

The ink according to the present disclosure can be used as ink for stationery such as felt-tip pens and markers, or as ink for various printers. Among them, the ink is preferably for ink jet recording because of its excellent pigment dispersibility and dispersion stability.

<Image Recording Method>

An image recording method of the present disclosure includes an image recording step of jetting the ink for ink jet recording according to the present disclosure onto a recording medium by an ink jet technique to record an image. As a result, an image formed by the ink fixed on the recording medium is recorded.

(Image Recording Step)

Hereinafter, the image recording step in the image recording method of the present disclosure will be described.

The image recording step in the present disclosure is not limited as long as it is a step of jetting an ink onto a recording medium.

As an aspect of jetting the ink of the present disclosure onto a recording medium, an aspect of jetting the ink by an ink jet technique onto the recording medium is particularly preferable.

An ink jet recording device used in the image recording method of the present disclosure is not particularly limited, and a known ink jet recording device that can achieve a desired resolution can be arbitrarily selected and used. That is, any known ink jet recording device, including a commercially available product, can perform jetting an ink onto the recording medium in the image recording method of the present disclosure.

Examples of ink jet recording devices that can be used in the present disclosure include a device including an ink supply system, a temperature sensor, and a heating unit.

Examples of ink supply systems include an original tank containing the ink of the present disclosure, a supply pipe, an ink supply tank that is disposed in front of an ink jet head, a filter, a piezo type ink jet head, and the like. The piezo type ink jet head can be driven so as to jet an ink of a multi-size dot of preferably 1 pl to 100 pl and more preferably 8 pl to 30 pl, at a resolution of preferably 320×320 dpi to 4,000×4,000 dpi (dot per inch), more preferably 400×400 dpi to 1,600×1,600 dpi, and even more preferably 720×720 dpi. The term "dpi" in the present disclosure indicates the number of dots per 2.54 cm (1 inch).

In the image recording step, since it is desirable that the jetted ink has a constant temperature, it is preferable that the ink jet recording device be provided with a unit for stabilizing the ink temperature. All parts of the piping system and members from the ink tank (intermediate tank in a case where there is an intermediate tank) to a nozzle jetting surface are targeted for the part that maintains a constant temperature. That is, heat insulation and heating can be performed from the ink supply tank to the ink jet head portion.

A method for controlling the temperature is not particularly limited, but for example, it is preferable to provide a plurality of temperature sensors at each piping site and perform heating control according to an ink flow rate and an environmental temperature. A temperature sensor can be provided near the ink supply tank and the nozzle of the ink jet head. Furthermore, a head unit to be heated is preferably thermally shielded or insulated so that a main body of the apparatus is not affected by the temperature from the outside air. In order to shorten a printer startup time required for heating or to reduce the loss of thermal energy, it is preferable to perform heat insulation from other parts and reduce the heat capacity of the entire heating unit.

Jetting of the ink using the above ink jet recording device is preferably performed after heating the ink to preferably 25° C. to 80° C. and more preferably 25° C. to 50° C. to decrease a viscosity of the ink to preferably 2 mPa·s to 30 mPa·s, more preferably to 3 mPa·s to 13 mPa·s. In a case of using an ink having a viscosity of 2 mPa·s to 30 mPa·s at 25° C. as the ink of the present disclosure, it is particularly preferable because then favorable jetting can be performed. By using this method, high jetting stability can be realized.

A temperature of the ink at the time of jetting is preferably constant, and a control range of the temperature of the ink is more preferably ±5° C. of the set temperature, even more preferably ±2° C. of the set temperature, and most preferably ±1° C. of the set temperature.

In the present disclosure, the recording medium is not particularly limited, and a recording medium known as a support or a recording material can be used. Examples of recording media include paper, paper laminated with plastic (such as polyethylene, polypropylene, and polystyrene), metal plates (such as aluminum, zinc, and copper), plastic films (for example, polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, and the like), paper or plastic films laminated or vapor-deposited with the above-mentioned metals, and the like.

From the viewpoint of inhibiting blurring, the recording medium is preferably heated before ink jetting. The phrase "before ink jetting" means that the ink is not yet applied on the recording medium by application or jetting.

A heating condition of the recording medium is preferably such that a surface temperature of the recording medium is 40° C. to 100° C., more preferably 40° C. to 80° C., and even more preferably 40° C. to 70° C. in a case of jetting the ink.

In the present disclosure, the surface temperature of the recording medium refers to a temperature measured 5 cm before the landing point.

A method for measuring the surface temperature is not particularly limited, but a thermocouple, a radiation-type thermometer, a resistance thermometer, a metal thermometer, a thermo label, or the like can be used, and in the present specification, a temperature measured by a thermocouple has been adopted.

A heating means for the recording medium is not particularly limited, and any known means can be used as appropriate. Examples of heating means include a heat drum, warm air, an infrared lamp, a heat oven, a platen heater, and the like.

(Ink Drying Step)

The image recording method of the present disclosure preferably further includes an ink drying step (also referred to as a "heat drying step") after the image recording step.

In the heating and drying step, the ink jetted onto the recording medium is preferably fixed by evaporation of an organic solvent (b) and water (c), which is optionally used in combination, by a heating means.

A step (heating and drying step) of applying heat to the jetted ink of the present disclosure to dry and fix the ink will be described.

A heating means is not limited as long as it can dry the organic solvent (b) and water (c), which is optionally used in combination, and examples thereof include, but are not limited to, a heat drum, warm air, infrared lamp, heat oven, heat plate heating, and the like.

A heating temperature is preferably 40° C. or higher, more preferably about 40° C. to 150° C., and even more preferably about 40° C. to 80° C. A drying/heating time can be appropriately set in consideration of a composition of an ink used and a printing speed.

EXAMPLES

Hereinafter, the present disclosure will be described more specifically with the reference to examples, but the present disclosure is not limited to the following examples as long as the gist thereof is not exceeded. Unless otherwise specified, "parts" are based on mass.

<Synthesis of Water-Soluble Polymer a-1>

To a three-neck flask equipped with a stirrer and a cooling pipe, dipropylene glycol was added in the same amount as the total amount of monomers described below, and heated to 85° C. under a nitrogen atmosphere.

A solution I obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid, and a solution II in which 1% by mass of t-butylperoxy-2-ethylhexanoate (Perbutyl 0 produced by NOF CORPORATION) with respect to the total mass of the monomer were dissolved in 20% by mass of dipropylene glycol with respect to the total mass of the monomer, were prepared. The solution I was added dropwise to the three-neck flask over 4 hours and the solution II over 5 hours.

After the completion of dropwise addition, the reaction was further continued for 2 hours, the temperature was raised to 95° C., and the mixture was heated and stirred for 3 hours to react all unreacted monomers. The disappearance of the monomer was confirmed by a nuclear magnetic resonance ($^1$H-NMR) method.

The obtained reaction solution was heated to 70° C., 20.0 molar equivalents of dimethylaminoethanol (dimethylethanolamine) was added as an amine compound, and then propylene glycol was added and stirred, and thereby an aqueous solution of 30% by mass of the water-soluble polymer a-1 was obtained. The constituent components of the obtained polymer were confirmed by $^1$H-NMR. Furthermore, the weight-average molecular weight (Mw) was determined by GPC, and was Mw=22,000. The mass ratio of each constitutional unit in the water-soluble polymer a-1 was as follows: stearyl methacrylate-derived constitutional unit/benzyl methacrylate-derived constitutional unit/hydroxyethyl methacrylate-derived constitutional unit/methacrylic acid-derived constitutional unit=20/39/27/14. However, the above mass ratio is a value not including dimethylaminoethanol.

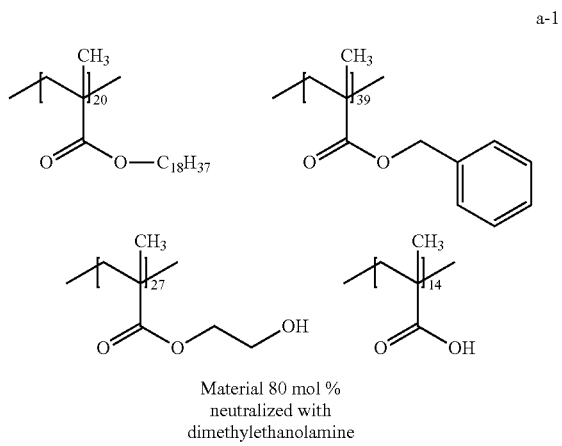

a-1

Material 80 mol % neutralized with dimethylethanolamine

—Preparation of Polymer Resin Particles c-1—

Water (250 g), 12-methacrylamidododecanoic acid (1.84 g), potassium hydrogen carbonate (0.68 g), and isopropanol (20 g) were charged in a 1-liter three-neck flask equipped with a stirrer, a thermometer, a reflux cooling pipe, and a nitrogen gas inlet tube, and the temperature was raised to 85° C. under a nitrogen stream. A mixed solution consisting of V-501 (radical polymerization initiator, manufactured by FUJIFILM Wako Pure Chemical Corporation) (0.57 g), potassium hydrogen carbonate (0.43 g), and water (9 g) was added thereto, and the mixture was stirred for 10 minutes. Then, a monomer solution consisting of methyl methacrylate (60 g) and 2-ethylhexyl methacrylate (40 g) was added dropwise to the above three-neck flask at a constant speed so that the addition was completed in 3 hours, and a mixed solution consisting of V-501 (0.28 g), potassium hydrogen carbonate (0.21 g), and water (6 g) was added in two portions immediately after the start of the dropwise addition of the monomer solution and 1.5 hours after the start of the dropping. After completion of dropwise addition of the monomer solution, the mixture was stirred for 1 hour, a mixed solution consisting of V-501 (0.28 g), potassium hydrogen carbonate (0.21 g), and water (6 g) was added, and the mixture was further stirred for 3 hours. The obtained reaction mixture was filtered using a mesh filter having a lattice width of 50 μm to obtain an aqueous dispersion of polymer resin particles c-1. The polymer resin particles c-1 had the structural unit represented by General Formula a, the structural unit (i) described above, and a structural unit derived from methyl methacrylate, and a specific structural formula is shown below. A numerical value of each constitutional unit of the following structural formula represents a mass ratio.

The obtained aqueous dispersion of the polymer resin particles c-1 had a pH of 7.5, a concentration of solid contents of 25% by mass, and a volume average particle size of 121 nm. In addition, the resin of the polymer resin particles c-1 had a weight-average molecular weight (Mw) of 200,000 and a Tg of 70° C.

C-1

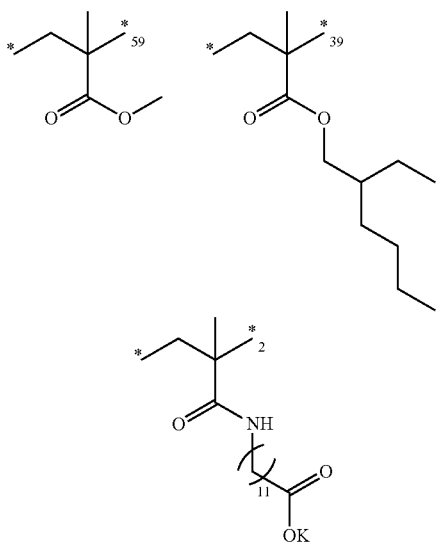

The volume average particle size of the polymer resin particles c-1 was measured by a dynamic light scattering method using a nanotrac particle size distribution measurement apparatus UPA-EX150 (manufactured by Nikkiso Co., Ltd.).

The glass transition temperature of the polymer resin particles was a value measured by a differential scanning calorimeter (DSC) EXSTAR 6220 manufactured by SII Nano Technology Inc. As the measurement conditions, a sample amount of 5 mg was sealed in an aluminum pan, and the peak top value of DSC of the measurement data at the time of the second temperature increase was applied in the nitrogen atmosphere in the following temperature profile.

30° C.→−50° C. (cooled at 50° C./min)
−50° C.→220° C. (temperature rise at 20° C./min)
220° C.→−50° C. (cooled at 50° C./min)
−50° C.→220° C. (temperature rise at 20° C./min)

The weight-average molecular weight (Mw) of the resin of the polymer resin particles is a value calculated as a polystyrene conversion value by gel permeation chromatography (GPC) under the following conditions. A calibration curve was produced from "standard sample TSK standard, polystyrene" manufactured by Tosoh Corporation: eight samples of "F-40," "F-20," "F-4," "F-1," "A-5000," "A-2500," "A-1000," and "n-propylbenzene."

~Condition~
Measurement apparatus: High-speed GPC HLC-8020 GPC (manufactured by Tosoh Corporation)
Detector: Differential Refractometer (RI) RI-8020 (manufactured by Tosoh Corporation)
Column: Three TSKgel Super Multipore HZ-H (4.6 mmID×15 cm, manufactured by Tosoh Corporation) was used.
Column temperature: 40° C.
Eluent: tetrahydrofuran (THF)
Sample concentration: 0.45% by mass
Injection volume: 10 µL
Flow rate: 0.35 mL/min The pH was measured using a pH meter WM-50EG (manufactured by Toa DDK).

Example 1

<Solvent Salt Milling Treatment of Pigment>

The crude pigment and common salt were put into a super mixer and mixed so as to have the following composition. While rotating the super mixer, diethylene glycol was added little by little to prepare a mixture of pigments (hereinafter, also referred to as "preliminary mixture").

—Composition—
Pigment described in Table 2: 100 parts by mass
Salt (Nakuru UM-10, manufactured by Naikai Shigyo Co., Ltd., average primary particle size 10 µm): 1,500 parts by mass
Diethylene glycol (DEG): 300 parts by mass Then, the temperature of the grinding section and the extrusion section of a continuous 1-axis kneader (Miracle KCK-L manufactured by Asada Iron Works Co., Ltd.) was set at 15° C. to 20° C. at 5 points, and the shaft rotation speed was set to 40 rpm at 5 points. The preliminary mixture obtained above was added to obtain a kneaded product. At this time, the current value (load) was about 5 A, the jet amount was 50 g/min, and the temperature of the jet product was 19° C.

1,000 parts by mass of the kneaded product thus obtained was added to 5,000 parts by mass of pure water heated to 80° C., and a stirring treatment was performed using a clear mix, followed by filtration and thorough washing with water to remove salt and diethylene glycol. The mixture was dried at 85° C. to obtain 100 parts by mass of the pigment composition.

<Preparation of Pigment Composition 1>

100 parts by mass of the solution of the water-soluble polymer a-1 obtained above, 95 parts by mass of the solvent milled pigment, and 240 parts by mass of water were mixed to obtain a mixed liquid.

Next, a Labo Star Mini LMZ015 (manufactured by Ashizawa Finetech Co., bead diameter: 0.3 mmφ, zirconia beads) was used for dispersion treatment for 3 hours. The thus-obtained pigment dispersion was subjected to centrifugal treatment at 7,000 G for 30 minutes (manufactured by Kubota Shoji Co., Ltd., high-speed large-capacity cooling centrifuge 7780), and the concentration of solid contents of the pigment in the treated liquid was adjusted with ultrapure water so that it became 15% by mass to obtain a pigment composition 1.

<Preparation of Ink 1>

The raw materials were mixed in the following composition, and the obtained mixed liquid was filtered with a glass filter (GS-25) manufactured by ADVANTEC, and then filtered with a filter (polyvinylidene fluoride (PVDF) membrane, pore size 5 µm) manufactured by Millipore, and thereby an ink 1 was produced.

—Composition of Ink 1—
Pigment composition 1 (15%): 27 parts by mass
Glycerin: 2 parts by mass
Diethylene glycol: 2 parts by mass
Propylene glycol (PG): 8.5 parts by mass
Potassium nitrate (alkali metal salt): 0.30 parts by mass
OLFINE E1010 (manufactured by Nissin Chemical Co., Ltd., surfactant): 0.5 parts by mass
Polymer resin particles (25%): 28 parts by mass
Ion exchange water: 100 parts by mass in total Examples 2 to 4

Examples 2 to 4 were performed in the same manner as in Example 1 except that the kind and content of the alkali metal salt contained in the ink 1 were changed as shown in Table 2.

Examples 5 to 8

Examples 5 to 8 were performed in the same manner as in Example 1 except that the type and content of the pigment contained in the ink 1 and the content of the water-soluble organic solvent were changed as shown in Table 2.

Example 9

Example 9 was performed in the same manner as in Example 1 except that the polymer resin particles were not included.

Comparative Example 1

Comparative Example 1 was performed in the same manner as in Example 1 except that the content of the alkali metal salt was changed as shown in Table 2.

Comparative Example 2

Comparative Example 2 was performed in the same manner as in Example 1 except that the alkali metal salt was not included.

Comparative Example 3

Comparative Example 3 was performed in the same manner as in Example 1 except that the content of the water-soluble organic solvent was changed as shown in Table 2.

Comparative Example 4

Comparative Example 4 was performed in the same manner as in Example 1 except that the water-soluble polymer was not included.

<Measurement of Average Primary Particle Size>

The average primary particle size of the pigment was measured using a TEM (transmission electron microscope, 1200EX (trade name) manufactured by JEOL Ltd.). Specifically, an ink diluted 1,000 times was added dropwise on Cu200 mesh to which a carbon film was attached, and then dried, and thereafter, major axes of 300 independent particles that did not overlap were measured from an image enlarged 100,000 times with TEM, and an average value thereof was calculated as an average particle size.

<Evaluation of Sedimentation Inhibiting Properties (Dispersion Uniformity of Pigment)>

A tube having a length of 30 cm and a diameter of 0.7 cm was placed vertically with its both ends closed, and it was filled with the obtained ink up to a height of 25 cm. After leaving it at room temperature (25° C.) for 1 week, a liquid having a lower end of 2 cm was sampled, and the absorbance was measured. The change rate of the absorbance of the ink after left for 1 month with respect to the initial absorbance of the ink was calculated. The greater the amount of pigment sedimentation, the greater the rate of change in absorbance. The evaluation standards are shown below.

—Evaluation Standards—

A: The rate of change in absorbance is 2% or less.
B: The rate of change in absorbance is more than 2% and 5% or less.
C: The rate of change in absorbance is more than 5% and 10% or less.
D: The rate of change in absorbance is more than 10% and less than 50%.
E: The rate of change in absorbance is 50% or more.

<Evaluation of Jettability>

The direction of the line head (main scanning direction) in which the nozzles was fixed in a direction orthogonal to the moving direction of the stage (sub-scanning direction) in which the head of a GELJET GX5000 printer manufactured by Ricoh could be moved in a predetermined linear direction at 500 mm/sec.

Next, the obtained ink was refilled in the storage tank connected to this. As a recording medium, Gyaku (registered trademark) Photo Finish Pro manufactured by FUJIFILM Corporation was attached to the stage.

Next, the stage was moved at 248 mm/min. The 96 lines were arranged parallel to the conveyance direction, and 2,000 ink droplets were jetted per nozzle (one jetting hole) under conditions in which the ink drop amount was 3.4 pL, the jetting frequency was 10 kHz, the nozzle arrangement direction x the conveyance direction was 75 dpi×1,200 dpi (dots per inch). Thereby, a print sample was produced.

The obtained print sample was visually observed to confirm that ink was jetted from all the nozzles (jetting holes).

After jetting the ink, the head was left as it was for 3 hours in an environment of 25° C. and 80% RH, and thereafter, a new recording medium was attached, and the ink was jetted again under the same conditions to produce a print sample.

The obtained print sample was visually observed to evaluate the number of jet failure nozzles after 2,000 jetting.

The evaluations A to E were given according to the number of jet failure nozzles (unit: number). The smaller the number of jet failure nozzles, the more excellent the aggregation inhibiting properties and the more excellent the ink jet jetting stability.

Furthermore, in the case where the number of jet failure nozzles was 11 or less, it was within the practically allowable range.

—Evaluation Standards—

A: The number of jet failure nozzles was 0 to 3.
B: The number of jet failure nozzles was 4 to 7.
C: The number of jet failure nozzles was 8 to 11.
D: The number of jet failure nozzles was 12 to 15.
E: The number of jet failure nozzles was 16 or more.

<Scratch Resistance>

A double-sided Tokubishi Art N (recording medium, manufactured by Mitsubishi Paper Mills) was fixed on a stage operating at 500 mm/sec, and a treatment liquid having the following composition was applied by a wire bar coater to about 1.7 g/m², and immediately after that, it was dried at 50° C. for 2 seconds. Thereafter, using a GELJET GX5000 printer head manufactured by Ricoh Co., Ltd., which was disposed obliquely to the scanning direction and fixed, a black solid image with each black ink was recorded under the conditions of a resolution of 1200×1200 dpi and a droplet jetting amount of 3.5 pL by a line method. Immediately after recording, the image recording surface was placed on a hot plate of 60° C. with the image recording surface facing upward, and immediately dried with warm air of 120° C. for 10 seconds using a dryer.

The unrecorded double-sided Tokubishi Art N (manufactured by Mitsubishi Paper Mills) was wrapped around a paperweight (weight 470 g, size 15 mm×30 mm×120 mm) (the area where the unrecorded Tokubishi Art and the evaluation sample were in contact was 150 mm²), and the above recorded sample was rubbed 20 times. The recorded sample after rubbing was visually observed and evaluated according to the following evaluation standards.

—Composition of Treatment Liquid—

TPGmME (tripropylene glycol monomethyl ether): 4.8% by mass
DEGmBE (diethylene glycol monobutyl ether): 4.8% by mass
Malonic acid: 16.0% by mass
Malic acid: 7.8% by mass
Propanetricarboxylic acid: 3.5% by mass
85% by mass phosphoric acid aqueous solution: 15.0% by mass
Defoamer (TSA-739 (15%) manufactured by Momentive Performance Materials Japan GK; emulsion type silicone anti-foaming agent): 0.07% by mass
Ion exchange water: 100% by mass in total —Evaluation Standards—

A: Peeling of the image (color material) was not visible on the recording surface.

B: Peeling was observed in the image (color material) of less than 5% of the area of the recording surface, but there was no problem in practical use.

C: Peeling was observed in the image (color material) of 5% or more and less than 50% of the area of the recording surface, but there was no problem in practical use.

D: Clear peeling was visually recognizable in the image (color material) of 50% or more of the recording surface area, which was a level causing a problem in practical use.

TABLE 2

| | Pigment | | | | Alkali metal salt | | | |
| --- | --- | --- | --- | --- | --- | --- | --- | --- |
| | Type | Based compound | Content with respect to total mass of ink (% by mass) | Average particle size (nm) | Type | Content with respect to total mass of ink (% by mass) | Pigment/alkali metal salt | Water-soluble polymer Type |
| Example 1 | PO43 | Perinone-based | 4 | 137 | Potassium nitrate | 0.25 | 16 | a-1 |
| Example 2 | PO43 | Perinone-based | 4 | 137 | Potassium nitrate | 0.10 | 40 | a-1 |
| Example 3 | PO43 | Perinone-based | 4 | 137 | Potassium nitrate | 1.0 | 4.0 | a-1 |
| Example 4 | PO43 | Perinone-based | 4 | 137 | Sodium chloride | 0.25 | 16 | a-1 |
| Example 5 | PO43 | Perinone-based | 2 | 137 | Potassium nitrate | 0.25 | 8.0 | a-1 |
| Example 6 | PO43 | Perinone-based | 8 | 137 | Potassium nitrate | 0.25 | 32 | a-1 |
| Example 7 | PR122 | Quinacridone-based | 4 | 137 | Potassium nitrate | 0.25 | 16 | a-1 |
| Example 8 | PO43 | Perinone-based | 4 | 137 | Potassium nitrate | 0.25 | 16 | a-1 |
| Example 9 | PO43 | Perinone-based | 4 | 137 | Potassium nitrate | 0.25 | 16 | a-1 |
| Comparative Example 1 | PO43 | Perinone-based | 4 | 137 | Potassium nitrate | 0.075 | 53 | a-1 |
| Comparative Example 2 | PO43 | Perinone-based | 4 | 137 | — | — | — | a-1 |
| Comparative Example 3 | PO43 | Perinone-based | 4 | 137 | Potassium nitrate | 0.25 | 16 | a-1 |
| Comparative Example 4 | PO43 | Perinone-based | 4 | 137 | Potassium nitrate | 0.25 | 16 | — |

| | Water-soluble polymer Content (% by mass) | Polymer resin particle Type | Polymer resin particle Content with respect to total mass of ink (%by mass) | Content of water-soluble organic solvent (PG and glycerin) | Water-soluble polymer/alkali metal salt | Sedimentation inhibiting properties | Jett-ability | Scratch resistance |
| --- | --- | --- | --- | --- | --- | --- | --- | --- |
| Example 1 | 1.2 | c-1 | 7 | 15 | 4.8 | A | A | A |
| Example 2 | 1.2 | c-1 | 7 | 15 | 12 | C | C | A |
| Example 3 | 1.2 | c-1 | 7 | 15 | 1.2 | A | B | A |
| Example 4 | 1.2 | c-1 | 7 | 15 | 4.8 | A | A | A |
| Example 5 | 0.6 | c-1 | 7 | 15 | 2.4 | A | A | A |
| Example 6 | 2.4 | c-1 | 7 | 15 | 9.6 | B | B | A |
| Example 7 | 1.2 | c-1 | 7 | 15 | 4.8 | A | A | A |
| Example 8 | 1.2 | c-1 | 7 | 8 | 4.8 | A | B | A |
| Example 9 | 1.2 | — | — | 15 | 4.8 | A | A | C |
| Comparative Example 1 | 1.2 | c-1 | 7 | 15 | 16.0 | D | D | A |
| Comparative Example 2 | 1.2 | c-1 | 7 | 15 | 0 | E | E | A |

TABLE 2-continued

| | | | | | | | | |
|---|---|---|---|---|---|---|---|---|
| Comparative Example 3 | 1.2 | c-1 | 7 | 20 | 4.8 | A | A | D |
| Comparative Example 4 | — | c-1 | 7 | 15 | 4.8 | E | E | A |

In addition, the abbreviations in Table 2 are as follows.

PO43: C.I. Pigment Orange 43 (perinone-based pigment)
PR122: C.I. Pigment Red 122 (quinacridone-based pigment)
a-1: the compound a-1 described above
c-1: the compound c-1 described above As shown in Table 2, sedimentation inhibiting properties, jettability, and scratch resistance were excellent in the ink for ink jet recording of Examples 1 to 8 which included a pigment; a water-soluble polymer in which the pigment was dispersed; an alkali metal salt; and a water-soluble organic solvent, in which a ratio of a content of the water-soluble polymer to a total mass of the alkali metal salt was 15 or less, and a content of the water-soluble organic solvent with respect to a total mass of the ink was 18% by mass or less.

Furthermore, Examples 1 to 7 containing 10% by mass or more of the water-soluble organic solvent with respect to the total mass of the ink were more excellent in scratch resistance. Examples 1, 3 to 5, 7, and 8 containing the pigment in an amount of 2.0% by mass to 7.5% by mass and the alkali metal salt in an amount of 0.15% by mass to 1.0% by mass with respect to the total mass of the ink were excellent in jettability and sedimentation inhibiting properties. Examples 1 to 8 containing the polymer resin particles and Examples 1 to 8 in which the water-soluble polymer contained the constitutional unit represented by Formula 1 were excellent in sedimentation inhibiting properties and jettability.

On the other hand, Comparative Example 1 in which the ratio of the content of the water-soluble polymer to the total mass of the alkali metal salt was more than 15 and Comparative Example 2 in which the alkali metal salt was not contained were inferior in sedimentation inhibiting properties and jettability. Furthermore, Comparative Example 3 in which the content of the water-soluble organic solvent was more than 18% by mass with respect to the total mass of the ink was inferior in scratch resistance.

The disclosure of Japanese Patent Application No. 2018-069684 filed Mar. 30, 2018 is incorporated herein by reference in its entirety.

All documents, patent applications, and technical standards described in the present specification are to the same extent as if each individual document, patent application, and technical standard were specifically and individually noted to be incorporated herein by reference.

What is claimed is:

1. An ink for ink jet recording, comprising:
   a pigment;
   a water-soluble polymer for dispersing the pigment;
   an alkali metal salt; and
   a water-soluble organic solvent,
   wherein a ratio of a content of the water-soluble polymer to a total mass of the alkali metal salt is 12 or less, and a content of the water-soluble organic solvent with respect to a total mass of the ink for ink jet recording is 18% by mass or less.

2. The ink for ink jet recording according to claim 1, wherein a content of the water-soluble organic solvent with respect to the total mass of the ink for ink jet recording is 10% by mass or more.

3. The ink for ink jet recording according to claim 1, wherein a content of the pigment with respect to the total mass of the ink for ink jet recording is 2.0% by mass to 7.5% by mass, and a content of the alkali metal salt with respect to the total mass of the ink for ink jet recording is 0.15% by mass to 1.0% by mass.

4. The ink for ink jet recording according to claim 1, wherein a ratio of a content of the pigment to the total mass of the alkali metal salt is 2 to 30.

5. The ink for ink jet recording according to claim 1, wherein the pigment contains at least one selected from the group consisting of carbon black, a perylene-based pigment, and a perinone-based pigment.

6. The ink for ink jet recording according to claim 1, wherein the pigment contains Pigment Orange 43.

7. The ink for ink jet recording according to claim 1, further comprising polymer resin particles.

8. The ink for ink jet recording according to claim 7, wherein a content of the polymer resin particles with respect to the total mass of the ink for ink jet recording is 3.0% by mass to 15.0% by mass.

9. The ink for ink jet recording according to claim 1, wherein the water-soluble polymer contains a constitutional unit represented by Formula 1,

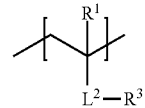

Formula 1 in Formula 1, $R^1$ represents a hydrogen atom or a methyl group, $L^2$ represents —C(=O)O—, —OC(=O)—, or —C(=O)NR$^2$—, $R^2$ represents a hydrogen atom or an alkyl group having 1 to 6 carbon atoms, and $R^3$ represents an alkyl group having 12 or more carbon atoms.

10. A method for producing an ink for ink jet recording, the method comprising a step of mixing a pigment, a water-soluble polymer for dispersing the pigment, an alkali metal salt, and a water-soluble organic solvent.

11. An image recording method comprising a step of jetting the ink for ink jet recording according to claim 1 onto a recording medium by an ink jet technique to record an image.

* * * * *